(12) United States Patent
Paniconi

(10) Patent No.: US 8,059,909 B2
(45) Date of Patent: Nov. 15, 2011

(54) ADAPTIVE GENERATION OF IRREGULAR SPATIAL SUB-SAMPLING FOR IMAGES

(75) Inventor: Marco Paniconi, San Jose, CA (US)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 12/111,925

(22) Filed: Apr. 29, 2008

(65) Prior Publication Data
US 2009/0268978 A1    Oct. 29, 2009

(51) Int. Cl.
*G06K 9/40* (2006.01)
*G06K 9/36* (2006.01)
*H04N 7/12* (2006.01)

(52) U.S. Cl. ............... 382/261; 382/238; 375/240.12

(58) Field of Classification Search ............ 382/232, 382/238, 260, 261, 299; 375/240.16, 240.21, 375/240.26, 240.29, 240.12; 358/426, 474, 358/539; 345/532; 348/631; 700/54
See application file for complete search history.

(56) References Cited

U.S. PATENT DOCUMENTS

| | | | |
|---|---|---|---|
| 4,325,085 A * | 4/1982 | Gooch ........................ 382/234 |
| 4,965,667 A | 10/1990 | Trew et al. | |
| 5,136,396 A * | 8/1992 | Kato et al. .................. 382/238 |
| 5,557,684 A | 9/1996 | Wang et al. | |
| 5,991,449 A * | 11/1999 | Kimura et al. .............. 382/238 |
| 5,995,668 A | 11/1999 | Corset et al. | |
| 6,212,235 B1 | 4/2001 | Nieweglowski et al. | |
| 6,249,548 B1 | 6/2001 | Kleihorst et al. | |
| 6,438,267 B1 | 8/2002 | Kondo et al. | |
| 6,442,207 B1 * | 8/2002 | Nishikawa et al. ...... 375/240.26 |

(Continued)

FOREIGN PATENT DOCUMENTS

JP    11317941 A2    11/1999

OTHER PUBLICATIONS

Chan, Yui-Lam, Hui, Wai-Lam and Siu, Wan-Chi, "A Block Motion Vector Estimation Using Pattern Based Pixel Decimation", http://ieeexplore.ieee.org/Xplore/login.jsp?url=/iel3/4816/13523/00622014.pdf?arnumber=622014, Jun. 1997, pp. 1153-1156, vol. 2.

(Continued)

*Primary Examiner* — Kanjibhai Patel
(74) *Attorney, Agent, or Firm* — Blakely, Sokoloff, Taylor & Zafman LLP

(57) ABSTRACT

An adaptive filter is applied to samples in an initial pattern of samples. The samples in the initial pattern correspond to a subset of the image pixels which are to be predicted using the samples. A level value of each sample in the pattern is varied. The level value corresponds to the intensity/signal value of the sample, and may have a strong effect on the prediction power of the samples. A first prediction pattern (i.e., the prediction signal corresponding to the sampling pattern) is generated from the samples. A sample movement process is performed on a current sample in the first prediction pattern to change a current position of the current sample in the first prediction pattern. A local prediction of pixels influenced by the sample is updated if the sample's position is changed. A sample removal process is performed on the current sample to remove the sample from the first pattern if a criteria is satisfied. A local prediction of pixels is updated if the current sample is removed. A second prediction pattern (i.e., the prediction signal corresponding to the new/second sampling pattern) is generated from the samples remaining in the first pattern. The second pattern is output.

19 Claims, 43 Drawing Sheets

U.S. PATENT DOCUMENTS

| | | | |
|---|---|---|---|
| 6,646,578 | B1 | 11/2003 | Au |
| 6,710,879 | B1 | 3/2004 | Hansen et al. |
| 6,809,840 | B1 | 10/2004 | Yu et al. |
| 6,826,584 | B1 | 11/2004 | Carrig et al. |
| 6,868,186 | B1 | 3/2005 | Sadeh |
| 7,130,443 | B1 | 10/2006 | Werner et al. |
| 7,319,794 | B2 * | 1/2008 | Hamada et al. ............... 382/233 |
| 7,366,361 | B2 * | 4/2008 | Cheng ........................... 382/294 |
| 7,372,471 | B1 | 5/2008 | Hutchins |
| 7,864,175 | B2 | 1/2011 | Voribiov et al. |
| 7,894,532 | B2 | 2/2011 | Otsuka |
| 2003/0133503 | A1 | 7/2003 | Paniconi |
| 2003/0169931 | A1 | 9/2003 | Lainema |
| 2004/0076333 | A1 | 4/2004 | Zhang et al. |
| 2004/0190085 | A1 | 9/2004 | Silverbrook et al. |
| 2005/0213660 | A1 | 9/2005 | Paniconi |
| 2005/0254106 | A9 | 11/2005 | Silverbrook et al. |
| 2005/0259740 | A1 | 11/2005 | Kobayashi et al. |
| 2006/0227249 | A1 | 10/2006 | Chen et al. |
| 2007/0057954 | A1 | 3/2007 | Imamura et al. |
| 2007/0064798 | A1 | 3/2007 | Paniconi et al. |
| 2007/0064804 | A1 | 3/2007 | Paniconi et al. |
| 2007/0064807 | A1 | 3/2007 | Paniconi et al. |
| 2008/0069430 | A1 | 3/2008 | Setija et al. |
| 2008/0221711 | A1 | 9/2008 | Trainer |

OTHER PUBLICATIONS

Belfor, Ricardo A.F., Hesp, Marc P.A., Lagendijk, Reginald L., Biemond, Jan, "Spatially Adaptive Subsampling of Image Sequences", http://ieeexplore.ieee.org/xpls/absall.jsp?arnumber=334991, Sep. 1994, pp. 492-500, vol. 3, Issue 5.

Ramponi, Giovanni and Carrato, Sergio, "An Adaptive Irregular Sampling Algorithm and It's Application to Image Coding", http://citeseer.ist.psu.edu/ramponi01adaptive.html, 2001, pp. 1-30.

European Search Report, EP 09 25 1215, dated Jul. 24, 2009, 2 pgs.

Kocharoen P., et al., "Adaptive Mesh Generation for Mesh-Based Image Coding Using Node Elimination Approach", May 16-20, 2005, pp. 2052-2056, vol. 3, IEEE, IEEE International Conference on Seoul, Korea, Piscataway, NJ, USA.

Le Floch H., et al., "Irregular Image Sub-sampling and Reconstruction by Adaptive sampling", Sep. 16-19, 1996, pp. 379-382, vol. 3, IEEE, Proceedings of the International Conference on Image Processing (ICIP), New York, NY, USA.

Baum, Eckhart and Speidel, Joachim, "Novel Video Coding Scheme Using Adaptive Mesh-Based Interpolation and Node Tracking", Jun. 21, 2000, pp. 200-208, vol. 4067, Proceedings of the SPIE: Visual Communications and Image Processing 2000.

Zergainoh-Mokraoui, Anissa, et al., "Efficient Memory Data Organization for Fast Still Image Decoding Implementation", Mar. 31, 2008, pp. 1201-1202, Acoustics, Speech and Signal Processing, IEEE, Piscataway, NJ, USA.

Bobach, T., et al., "Issues and Implementation of C1 and C2 Natural Neighbor Interpolation", Jan. 1, 2006, pp. 187-189, vol. 4292, Advances in Visual Computing Lecture Notes in Computer Science, Berlin.

* cited by examiner

ADAPTIVE GENERATION OF IRREGULAR SPATIAL SUB-SAMPLING FOR IMAGES

RELATED APPLICATIONS

The present application is related to the following commonly-owned, concurrently-filed applications: application Ser. No. 12/111,927, filed Apr. 29, 2008, entitled "Sample Level Variation for Spatial Sub-sampled Images" and application Ser. No. 12/111,928, filed Apr. 29, 2008, entitled "Adaptive Area of Influence Filter for Irregular Spatial Sub-sampled Images".

FIELD

This invention relates generally to image and video processing, and more particularly to sub-sampling of images or video.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright© 2007, Sony Electronics Inc., All Rights Reserved.

BACKGROUND

Evaluation of image and video processing has three aspects: computational complexity, storage requirements of the processed data, and visual quality of the reconstituted image or video data. Image and video processing generally utilizes some form of sub-sampling. Sub-sampling is the process of selecting, for example, certain pixels from an image which are good predictors of the pixels surrounding the sample in the original. Storage or transmission occurs only for the selected sub-samples, rather than the entire image, thereby reducing the size. Quality of the reconstituted image depends upon the effectiveness of the sub-samples as predictors of the pixels in the image. Irregular sub-sampling selects samples in the image so to improve the prediction power, which will generally lead to an irregular sampling pattern (e.g., more samples positioned near object edges and high texture regions, and less samples in uniform low texture background regions) rather than a regular sampling pattern.

Improving predictive strength requires finding better sub-samples or using more sub-samples. Using more sub-samples reduces the storage savings, while finding better sub-samples requires greater computational complexity. Prior art techniques used for image and video processing are primarily block based techniques with simple filters. However, these techniques do not fully exploit the coupled nature of pixel based selection of sample position, sample level variation, and adaptive filtering.

SUMMARY

An adaptive filter is applied to samples in an initial pattern of samples. The samples in the initial pattern correspond to a subset of the image pixels which are to be predicted using the samples. A level value of each sample in the pattern is varied. The level value corresponds to the intensity/signal value of the sample, and may have a strong effect on the prediction power of the samples. A first prediction pattern (i.e., the prediction signal corresponding to the sampling pattern) is generated from the samples. A sample movement process is performed on a current sample in the first prediction pattern to change a current position of the current sample in the first prediction pattern. A local prediction of pixels influenced by the sample is updated if the sample's position is changed. A sample removal process is performed on the current sample to remove the sample from the first pattern if a criteria is satisfied. A local prediction of pixels is updated if the current sample is removed. A second prediction pattern (i.e., the prediction signal corresponding to the new/second sampling pattern) is generated from the samples remaining in the first pattern. The second pattern is output.

DETAILED DESCRIPTION

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
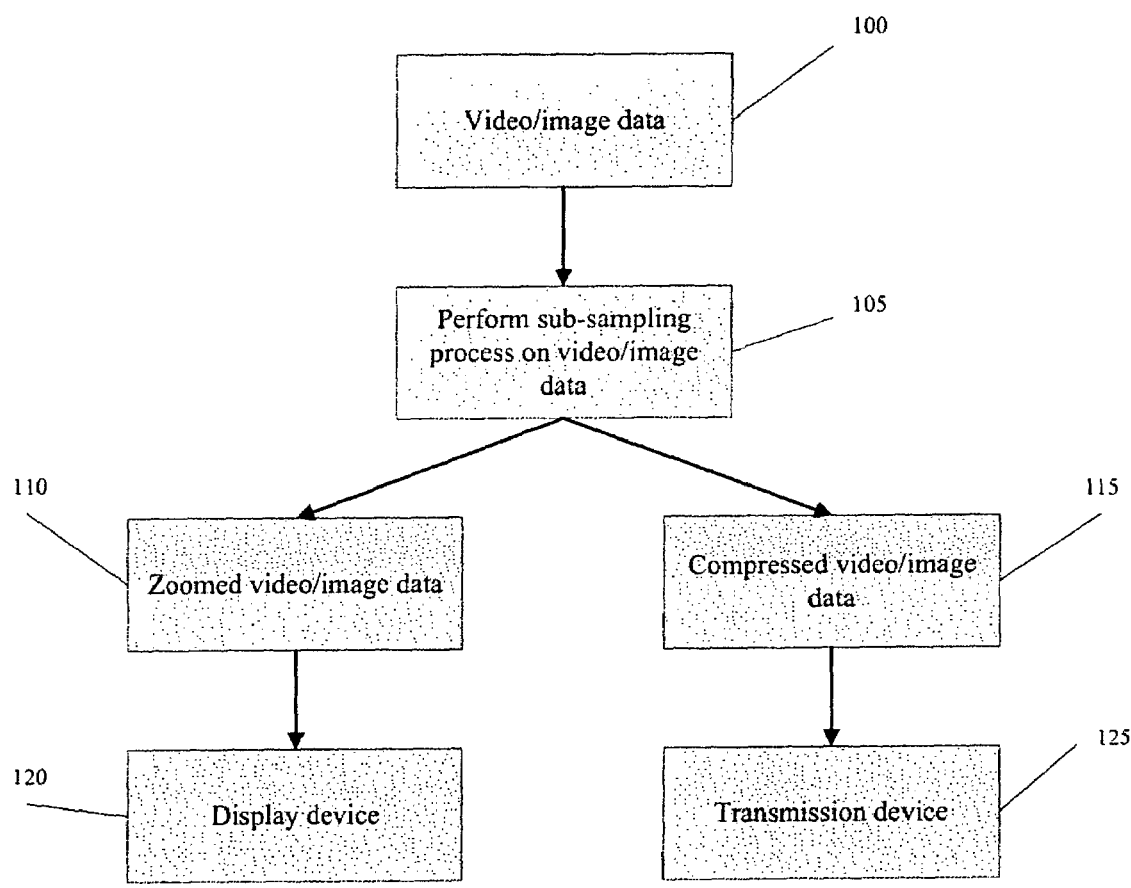
FIG. 1A is a diagram illustrating an overview of the operation of an embodiment of the invention.

Beginning with an overview of the operation of the invention, FIG. 1A illustrates an embodiment of an adaptive generator of irregular spatial sub-sampling for images. Image data may, for example, be still images or video frame data. Block 105 receives image data 100 and sub-samples image data 100 to produce zoomed 110 or compressed image data 115, as described below in more detail in conjunction with FIG. 1B. Display device 120 displays zoomed image data 110. Zooming the image data 100 allows, for example, high definition video data to be displayed on a standard definition television. Alternatively, transmission device 125 transmits compressed image data 115. Compressing image data 100 allows, for example, faster streaming of video data from a website to an end user.

Figure 1B:
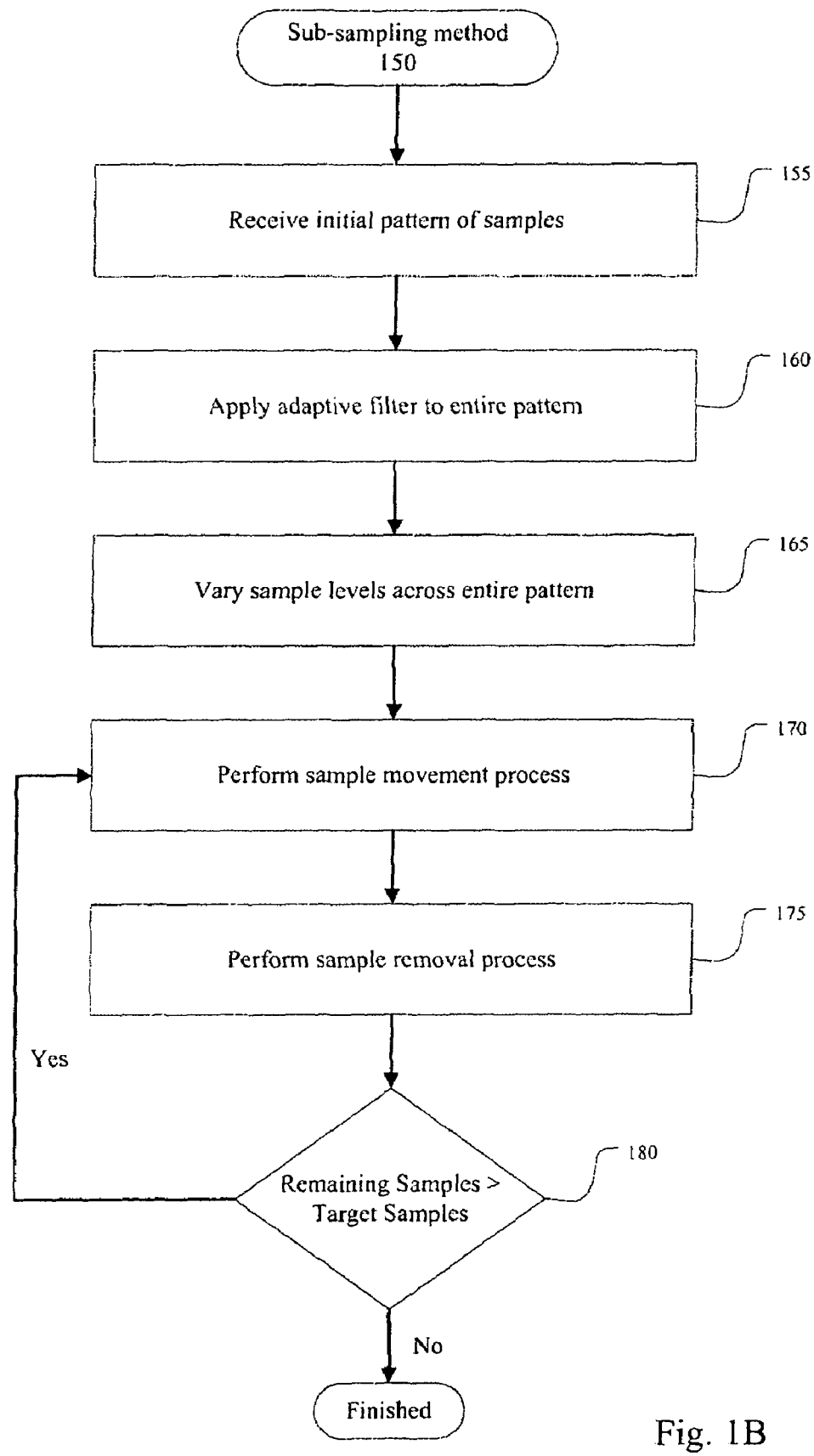
FIG. 1B is flow diagram illustrating a method to be performed by a processor according to an embodiment of the invention.
Figure 2A:
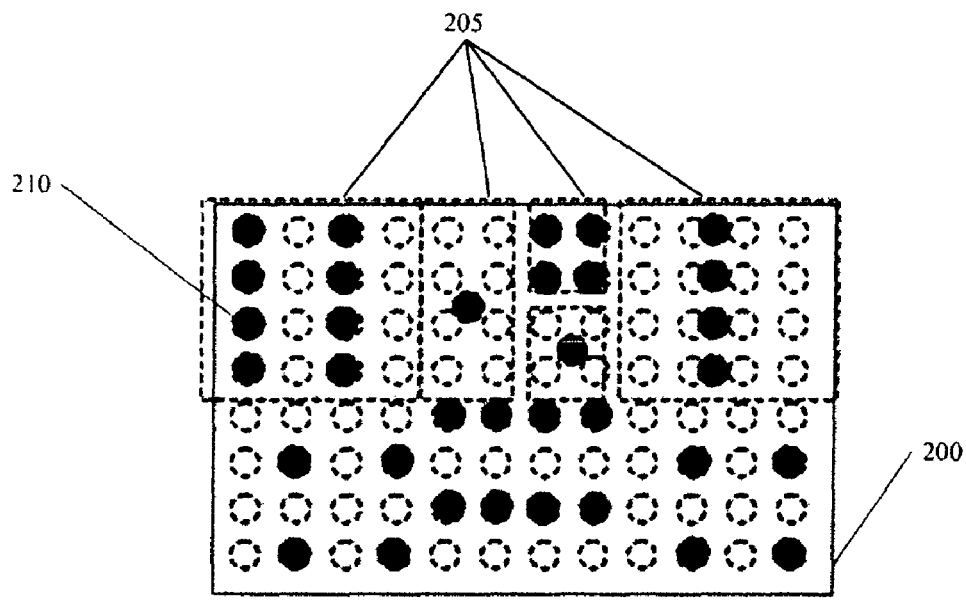
FIGS. 2A-2C are examples illustrating the operation of an embodiment of the invention.
Figure 2B:
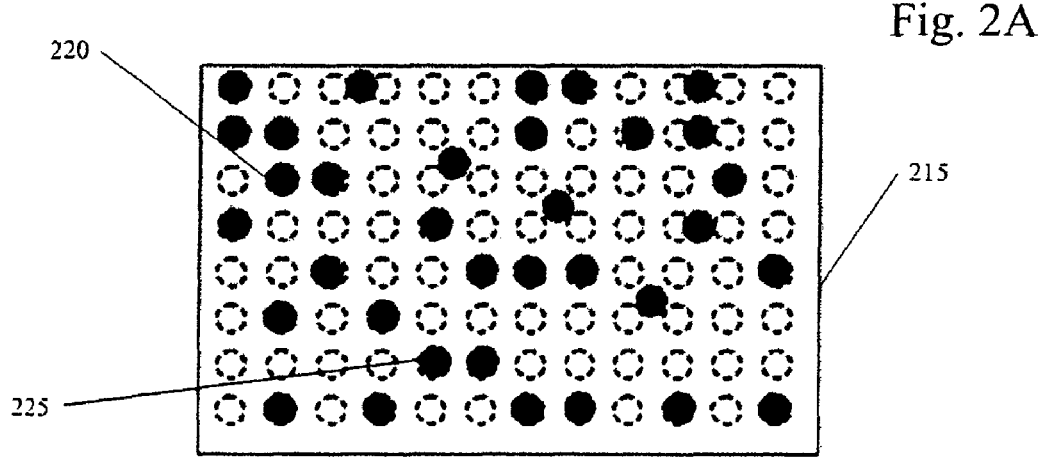
Figure 2C:
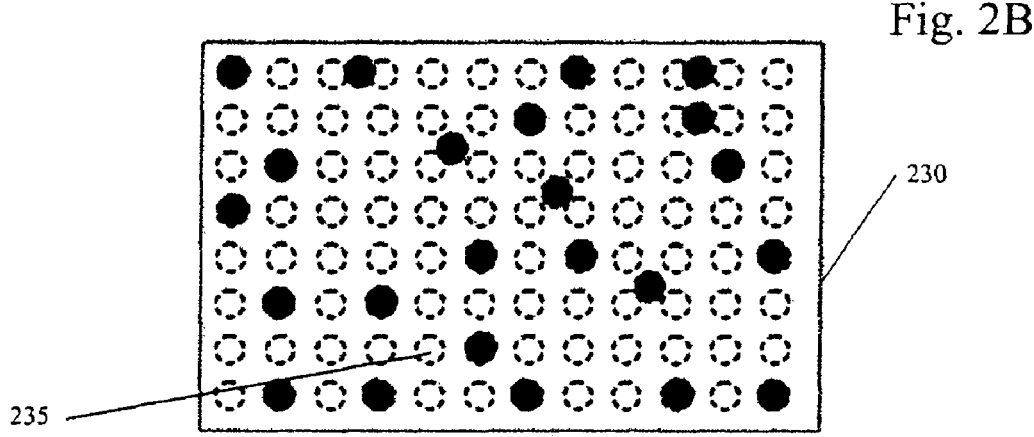

FIG. 1B illustrates an embodiment of sub-sampling method 150 performed by adaptive generator 105. FIGS. 2A through 2C illustrate the results of the method 150. Sub-sampling method 150 receives an initial pattern of samples at block 155. At block 160, the method 150 applies an adaptive filter to the initial pattern. One embodiment of the operations represented by block 160 is described below in conjunction with FIG. 15. At block 165, the method 150 varies sample level values across the entire pattern of samples, as described below in conjunction with FIGS. 11 and 12. Pattern state 200 illustrates an initial pattern, including blocks 205 resulting from block based preprocessing of the initial sample pattern. Pattern state 200 may be referred to as a first sampling pattern.

At block 170, the method 150 performs a sample movement process upon each sample in the initial pattern. One embodiment of the operations represented by block 170 is described below in conjunction with FIGS. 5 through 6C. Pattern state 215 illustrates pattern state 200 following performance of sample movement process 170. Sample 210 in pattern state 200 moves to sample position 220 in pattern state 215 as a result of the sample movement process.

At block 175, the method 150 performs a sample removal process upon each sample in the initial pattern, as described below in more detail in conjunction with FIGS. 7 through 10C. Pattern state 230 illustrates pattern state 215 following performance of sample removal process 175. Sample removal process 175 removes sample 225 from pattern state 215, so that sample position 235 is empty in pattern state 230. At decision block 180, the method returns control to sample movement process 170 when the number of samples remaining exceeds the target number of samples. Pattern state 230 may be referred to as a second sampling pattern.

Figure 1C:
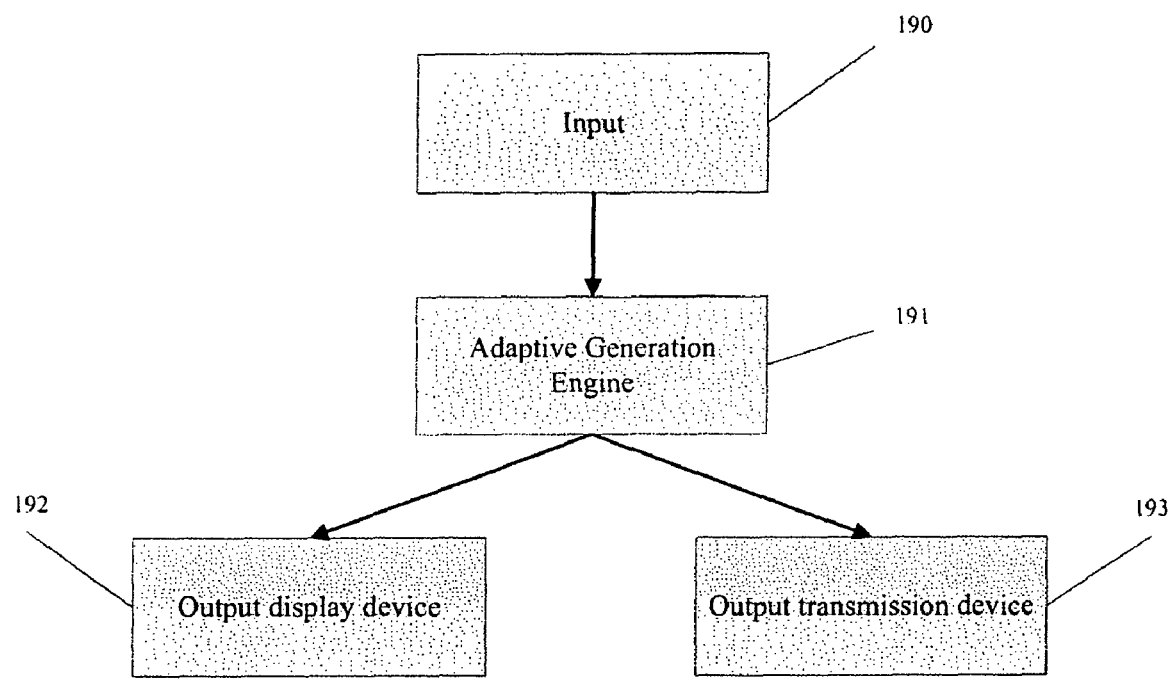
FIG. 1C is a diagram illustrating an overview of the data flow of an embodiment of the invention.

FIG. 1C illustrates a flow of data through adaptive generator 191. Input 190 receives image data directed toward adaptive generator 191. After processing, adaptive generator 191 sends processed data to an output device, such as output display device 192 or output transmission device 193.

Figure 3:
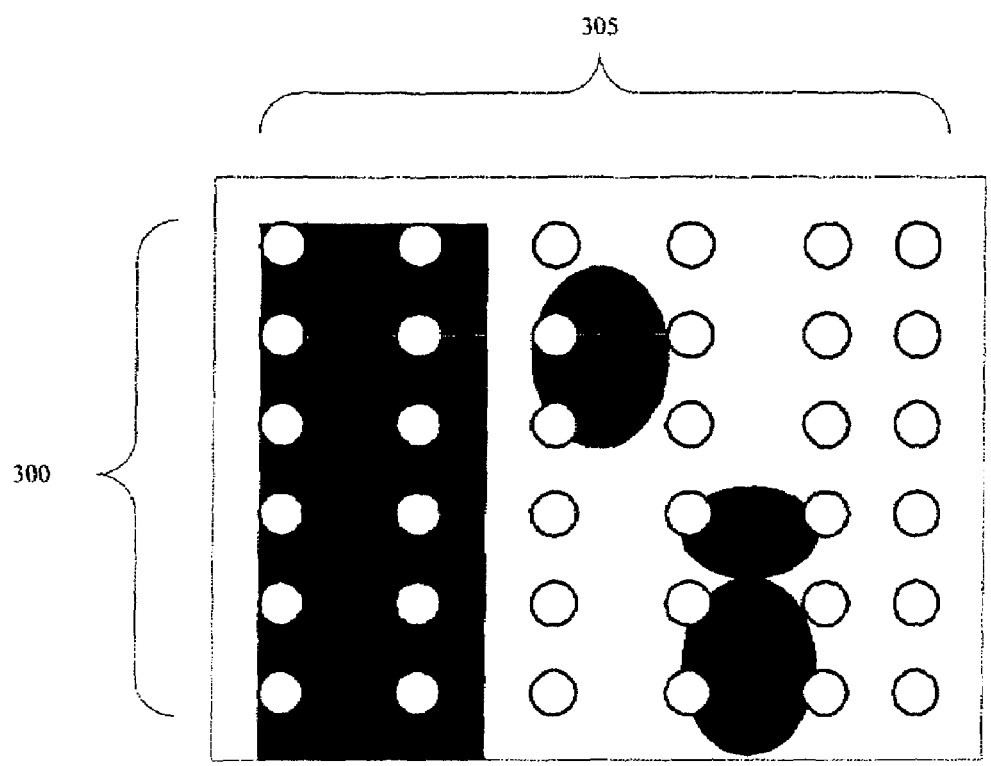
FIG. 3 is an example illustrating a uniform sampling method.
Figure 4:
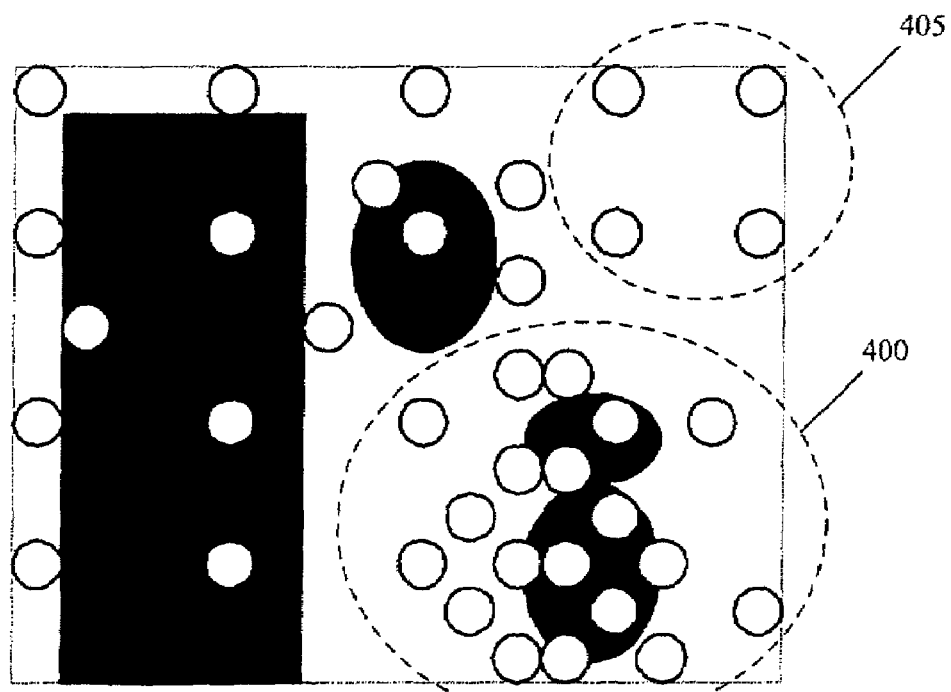
FIG. 4 is an example illustrating the results of an irregular sampling method according to an embodiment of the invention.

FIG. 3 illustrates an initial sample pattern, such as that received by sub-sampling method 150. Positions of sample rows 300 and sample columns 305 are uniform over the original data space, not over areas of complexity in the original data space. FIG. 4, in contrast, illustrates a pattern resulting from an embodiment of the adaptive generation of irregular spatial sub-sampling for images, such as the embodiment illustrated in FIG. 1. Sample group 405 occurs over an area of low complexity in the original data, and thus has a correspondingly low sample density, since fewer samples are necessary for acceptable visual quality. Sample group 400, by contrast, occurs over an area of high complexity in the original data, and thus has a higher density of samples with a corresponding improvement in prediction strength and resulting visual quality.

Figure 5:
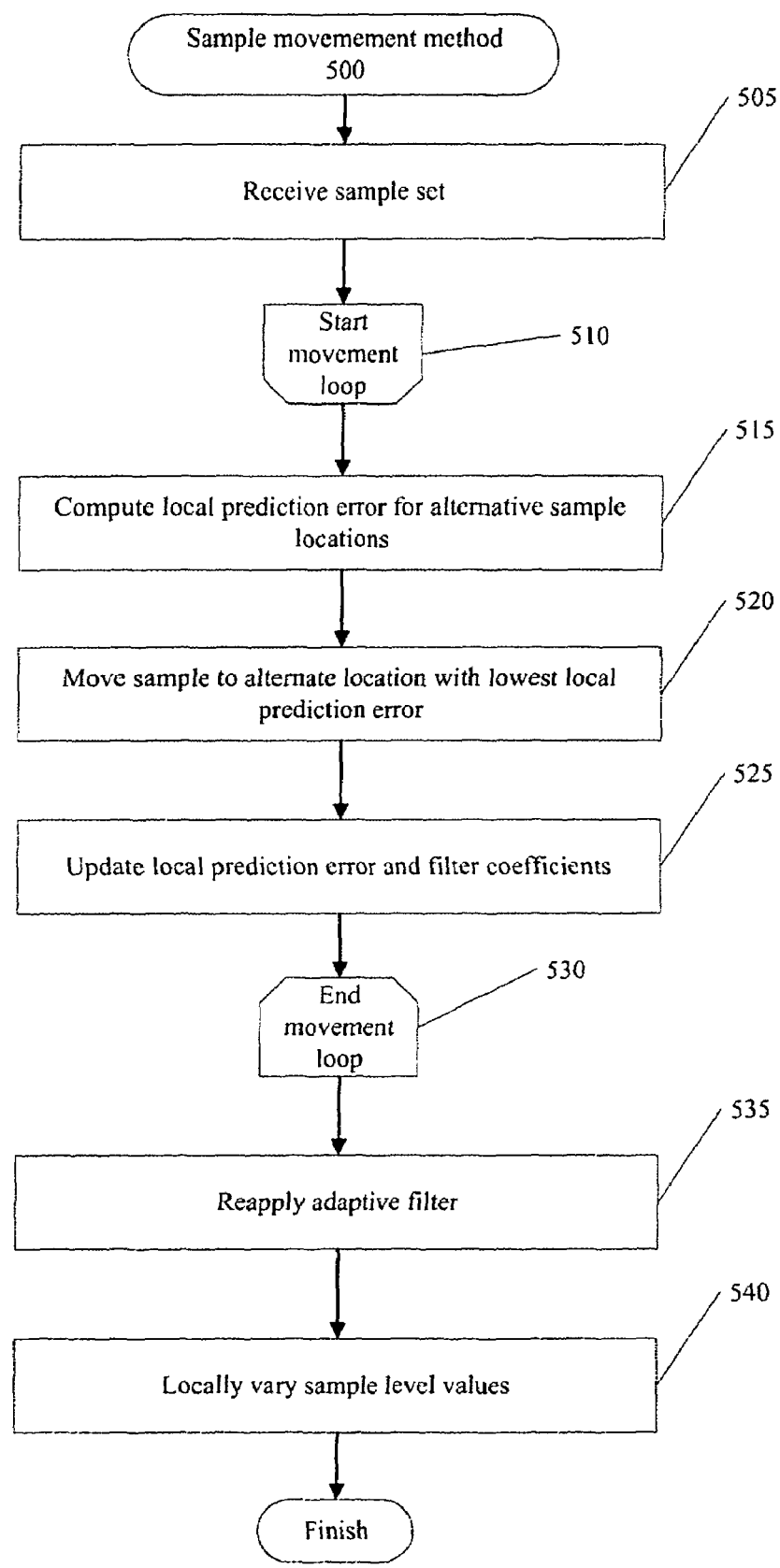
FIG. 5 is a flow diagram illustrating a sample movement method to be performed by a processor according to an embodiment of the invention.
Figure 6A:
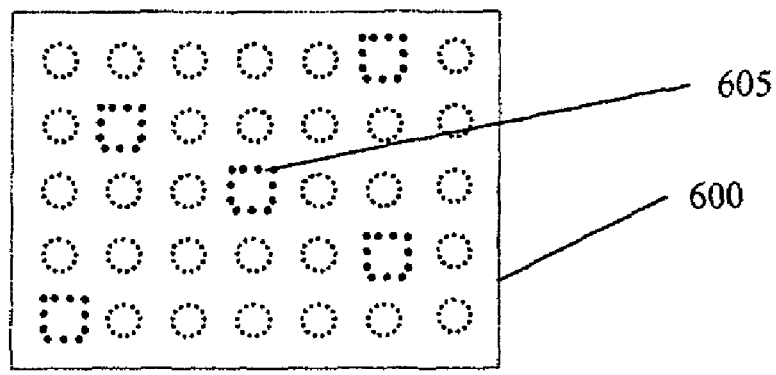
FIGS. 6A-6C are examples illustrating the movement of samples according to an embodiment of the invention.
Figure 6B:
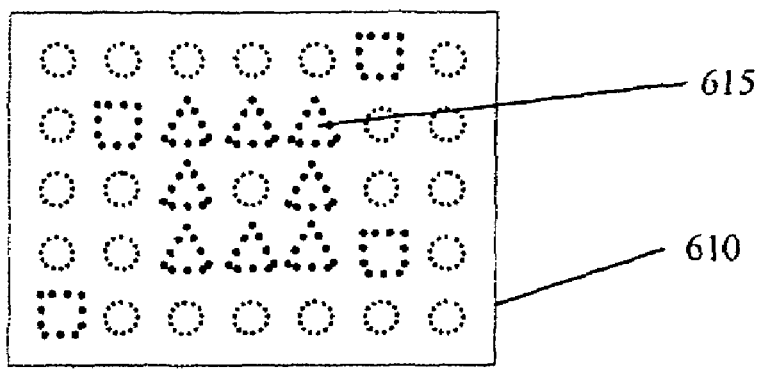
Figure 6C:
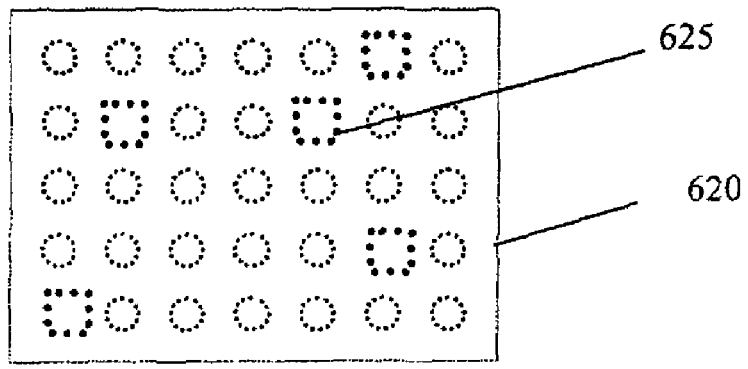

Turning to FIGS. 5 through 6C, sample movement method 500 illustrates one embodiment of sample movement process 170, and FIGS. 6A through 6C illustrate results of that process. After receiving sample set 505, sample movement loop 510 begins processing the sample set. Pattern state 600 shows sample 605 selected for processing by the sample movement method. At block 515, the method computes local prediction errors for different sample positions such as sample position 615, visible in pattern state 610. The local prediction error is the sum of the prediction errors of individual pixels in the area of influence of the current sample. The area of influence for a given sample is the set of surrounding pixels that use that sample in their filter prediction. Area of influence is described in greater detail below in conjunction with FIG. 12. At block 520, the method determines that sample location 625 has the lowest local prediction error of the alternative locations and moves sample 605 to sample position 625, visible in pattern state 620. At block 525, the method updates local prediction error and filter coefficients for pixels occurring within the current sample's area of influence. The filter coefficients for a given pixel define a prediction relationship between the pixel and the surrounding samples.

Sample movement method 500 ends at loop end 530 after processing all samples in the sample set. At block 535, the method 500 applies the adaptive filter, as described in greater detail below in conjunction with FIG. 15. At block 540, the method 500 locally varies sample values, as described in greater in detail below in conjunction with FIGS. 11 and 12. The method 500 applies the adaptive filter and locally varies sample level values as determined by the new sample positions. The sample level variation process varies the level value for each sample and selects the value that best reduces the local prediction error.

Figure 7:
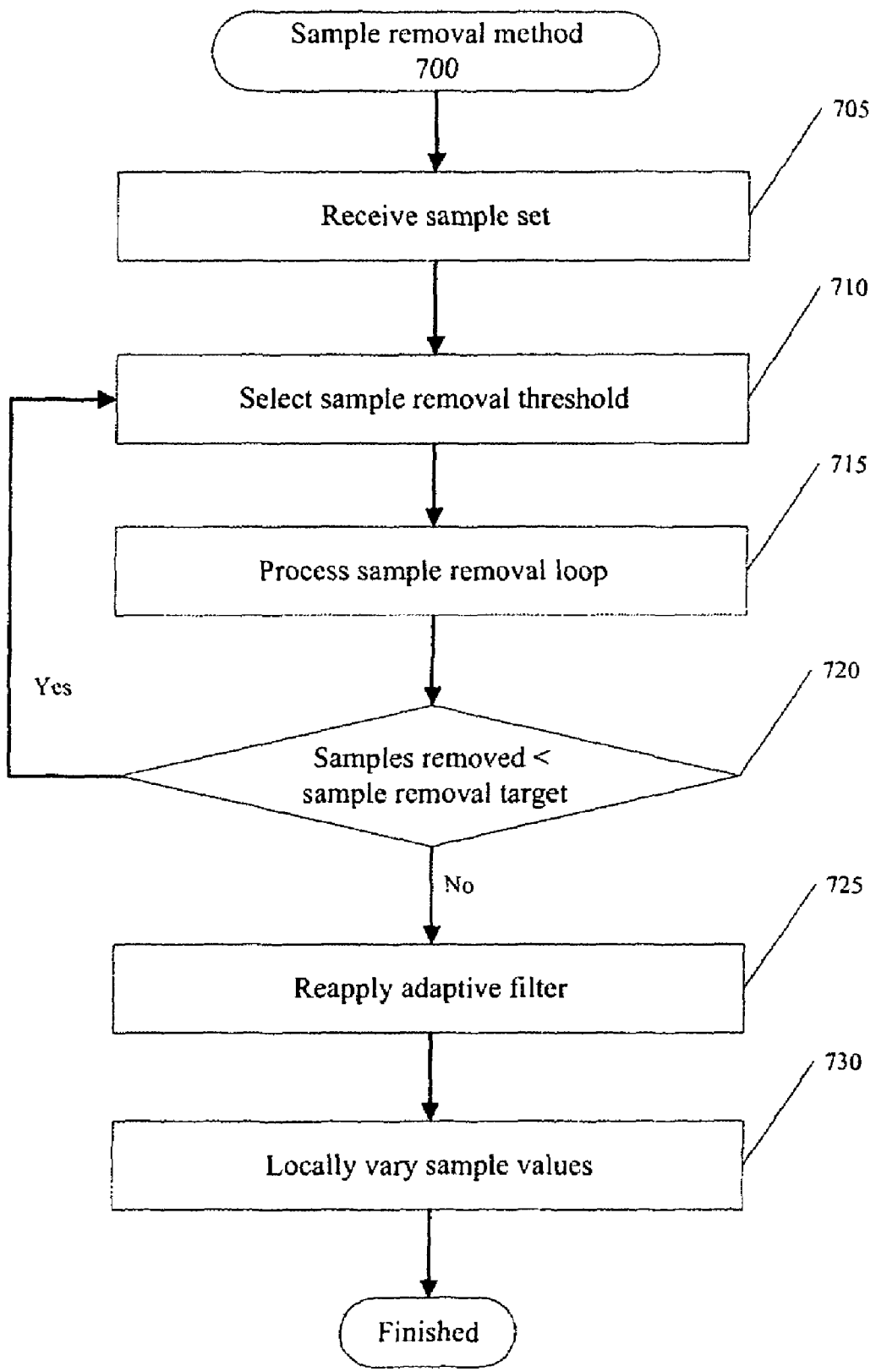
FIG. 7 is a flow diagram illustrating a sample removal method to be performed by a processor according to an embodiment of the invention.
Figure 8:
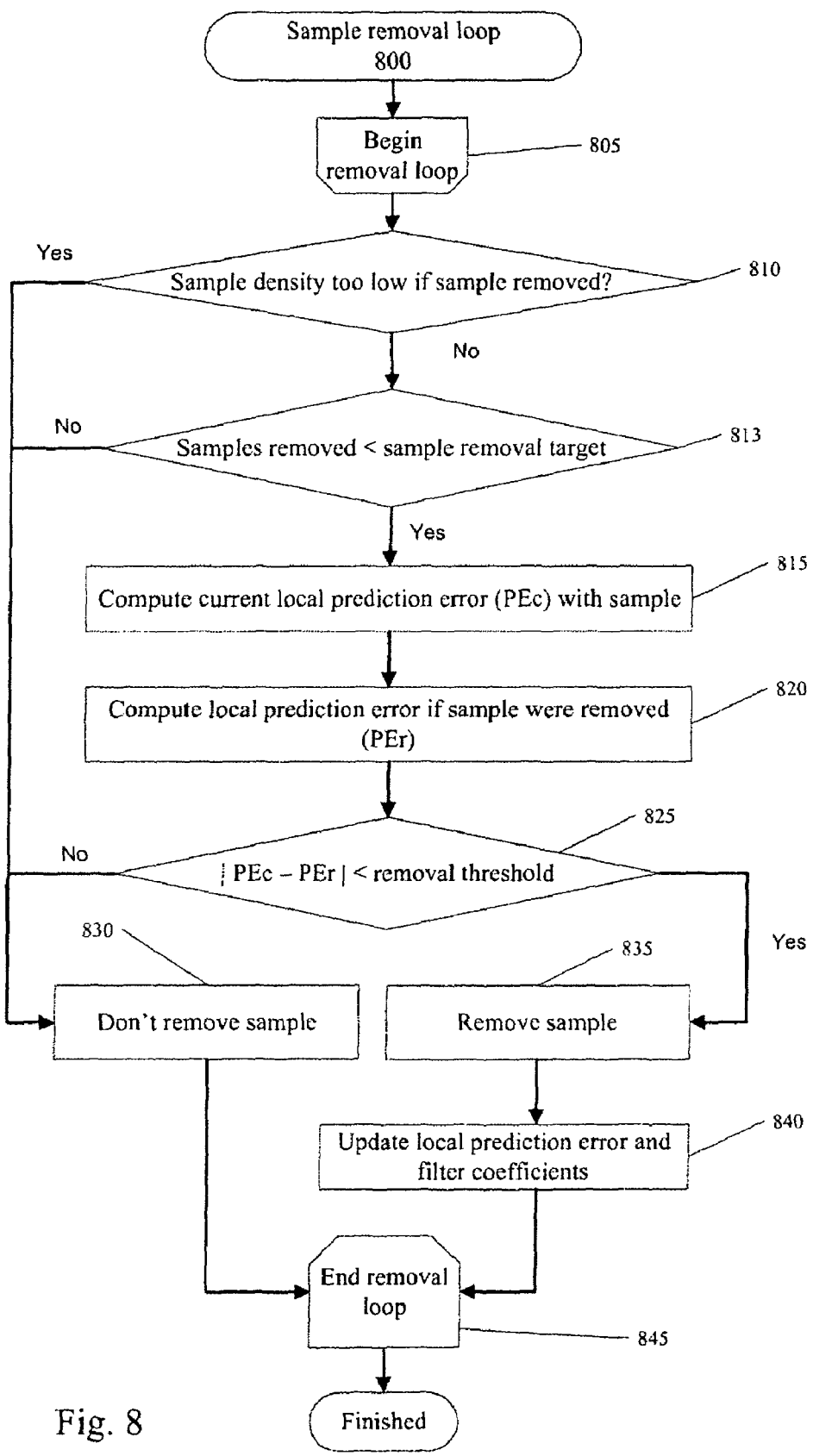
FIG. 8 is a flow diagram illustrating a sample removal loop to be performed by a processor according to an embodiment of the invention.

Turning to FIG. 7, sample removal method 700 illustrates one embodiment of sample removal process 175. The sample removal method removes samples from the sample pattern if the removal satisfies certain criteria. In one embodiment, the criteria is defined in terms of the decrease in predictive strength resulting from removal of the sample from the sample pattern. The method 700 receives a sample set at block 705 and selects a sample removal threshold at block 710. The method 700 processes the sample removal loop at 715, as described in greater detail below in conjunction with FIG. 8. If sample removal loop 715 fails at decision block 720 to remove a target number of samples, the method selects a new sample removal threshold at block 710 and resumes. The sample removal threshold starts out as a small value and is increased each pass to eventually meet the target removal value. The sample target removal value is a fixed number defined prior to the sample removal process.

Otherwise, the method reapplies the adaptive filter to pixels in the removed sample's area of influence at block 725, as described in greater detail below in conjunction with FIG. 15. The method 700 locally varies the sample values at block 730 as described below in greater detail in conjunction with FIGS. 11 and 12. Execution continues at decision block 180 in sub-sampling method 150.

Figure 9:
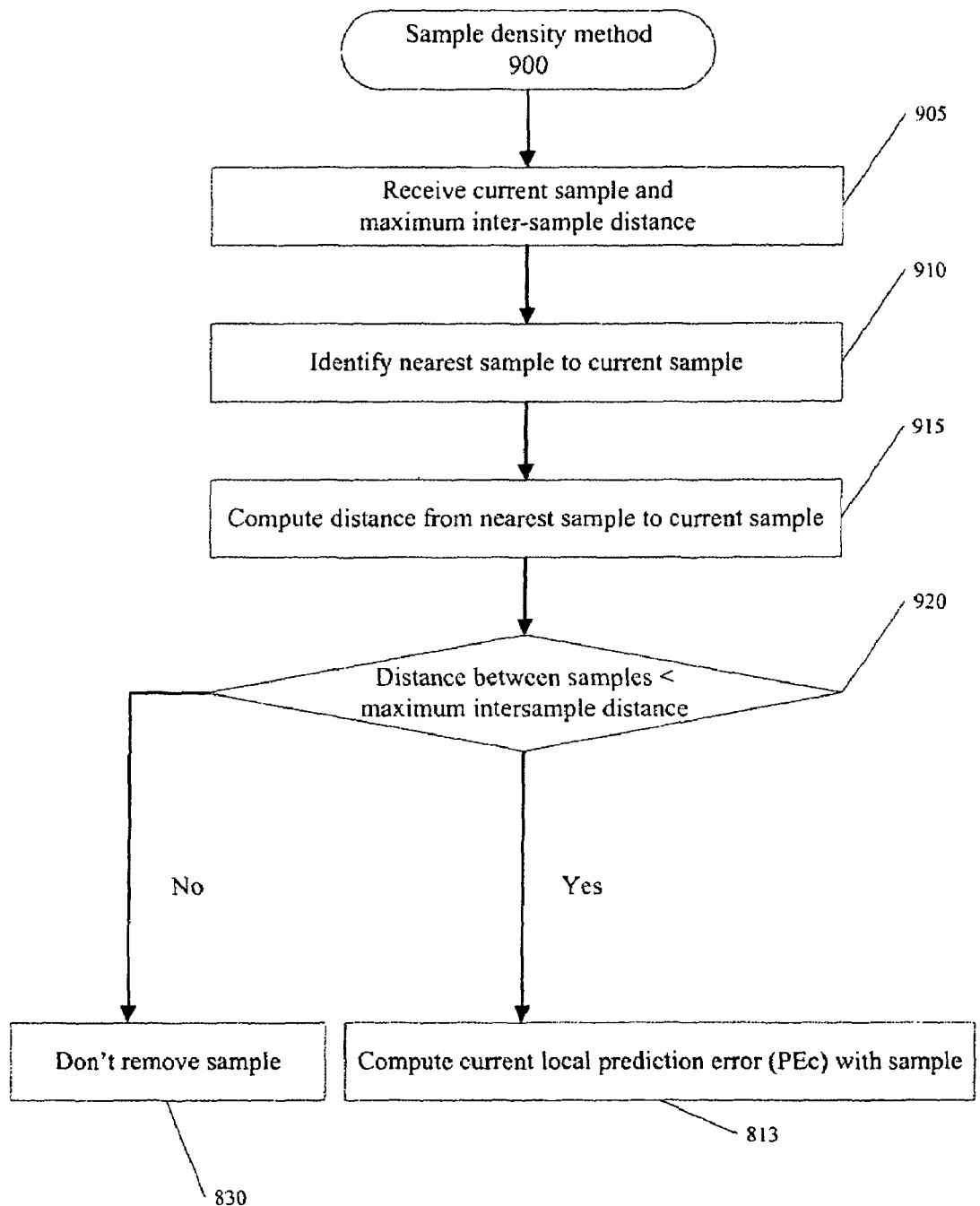
FIG. 9 is a flow diagram illustrating a sample density method to be performed by a processor according to an embodiment of the invention.
Figure 10A:
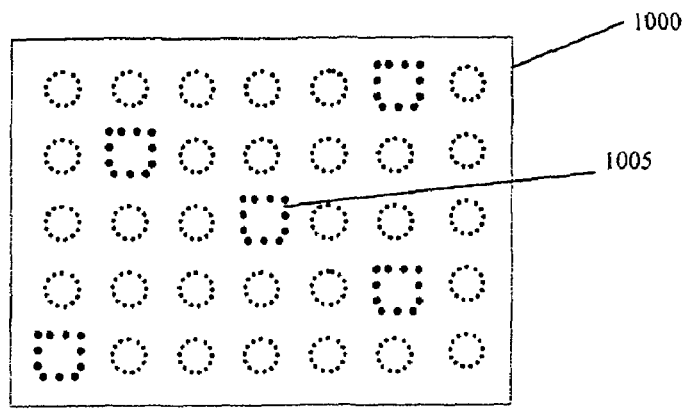
FIGS. 10A-10C are examples illustrating removal of samples according to an embodiment of the invention.
Figure 10B:
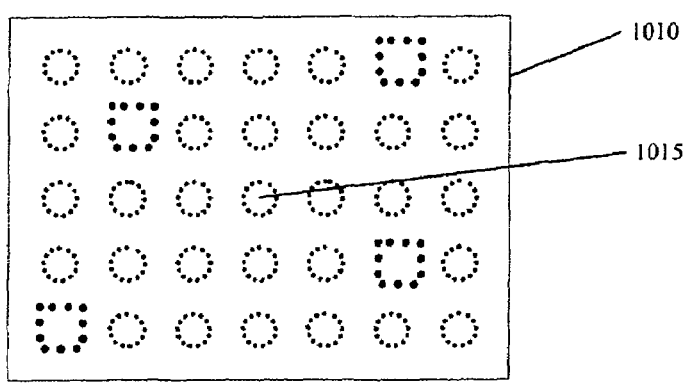
Figure 10C:
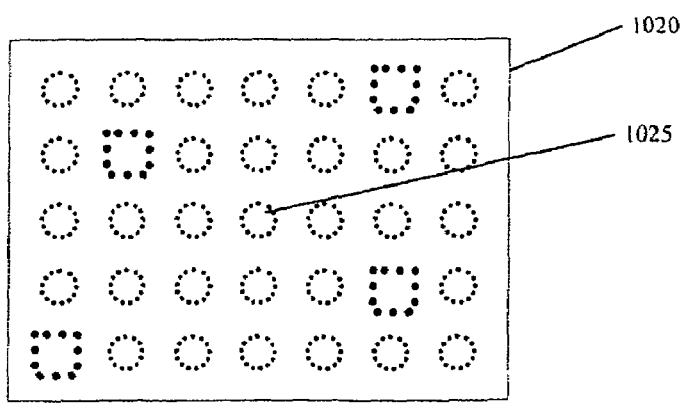

Turning to FIGS. 8 and 10A through 10C, sample removal loop 800 illustrates one embodiment of sample removal loop 715 and FIGS. 10A through 10C illustrate results of this loop. The loop 800 begins at block 805 and determines whether removing the sample would cause too little sample density at block 810, discussed below in conjunction with FIG. 9. If at block 813 the sample removal loop has removed the target number of samples, the loop terminates at block 845. Pattern state 1000 illustrates current sample 1005. At block 815, the loop 800 computes the current local prediction error on the basis that current sample 1005 is present in the pattern, as in pattern state 1000. At block 820, the loop 800 computes the local prediction error on the basis that current sample 1005 is not present in the pattern at position 1015, as in pattern state 1010. If at decision block 825 removing the current sample produces a change in prediction error under the removal threshold as in equation 1, the loop 800 removes the sample at block 835. In one embodiment, the removal threshold is defined as:

$$|E_0 - E_1| < T \quad (1)$$

where $E_0$ is the current local prediction error, $E_1$ is the local prediction error with the current sample removed, and T is the sample removal threshold.

Pattern state 1020 illustrates this removal, showing sample position 1025 as empty. At block 840, the loop updates the local prediction error and filter coefficients for the pixels in the area of influence of sample 1005. Otherwise, if the loop 800 determines the change in local prediction error would exceed the threshold, the loop does not remove the sample at block 830.

Turning to FIG. 9, sample density method 900 illustrates one embodiment of sample density decision block 810. The method 900 receives the current sample and the maximum inter-sample distance parameter at block 905. The method identifies the nearest sample to the current sample at block 910 and computes the distance from the nearest sample to the current sample at block 915. If at block 920 the distance between the sample and its nearest neighbor is greater than the maximum inter-sample distance, sample removal does not occur and execution resumes at block 830 in sample removal loop 800. Otherwise, execution continues at block 813 of sample removal loop 800. The maximum inter-sample distance maintains a minimum sample density in low complexity areas of the image.

Figure 11:
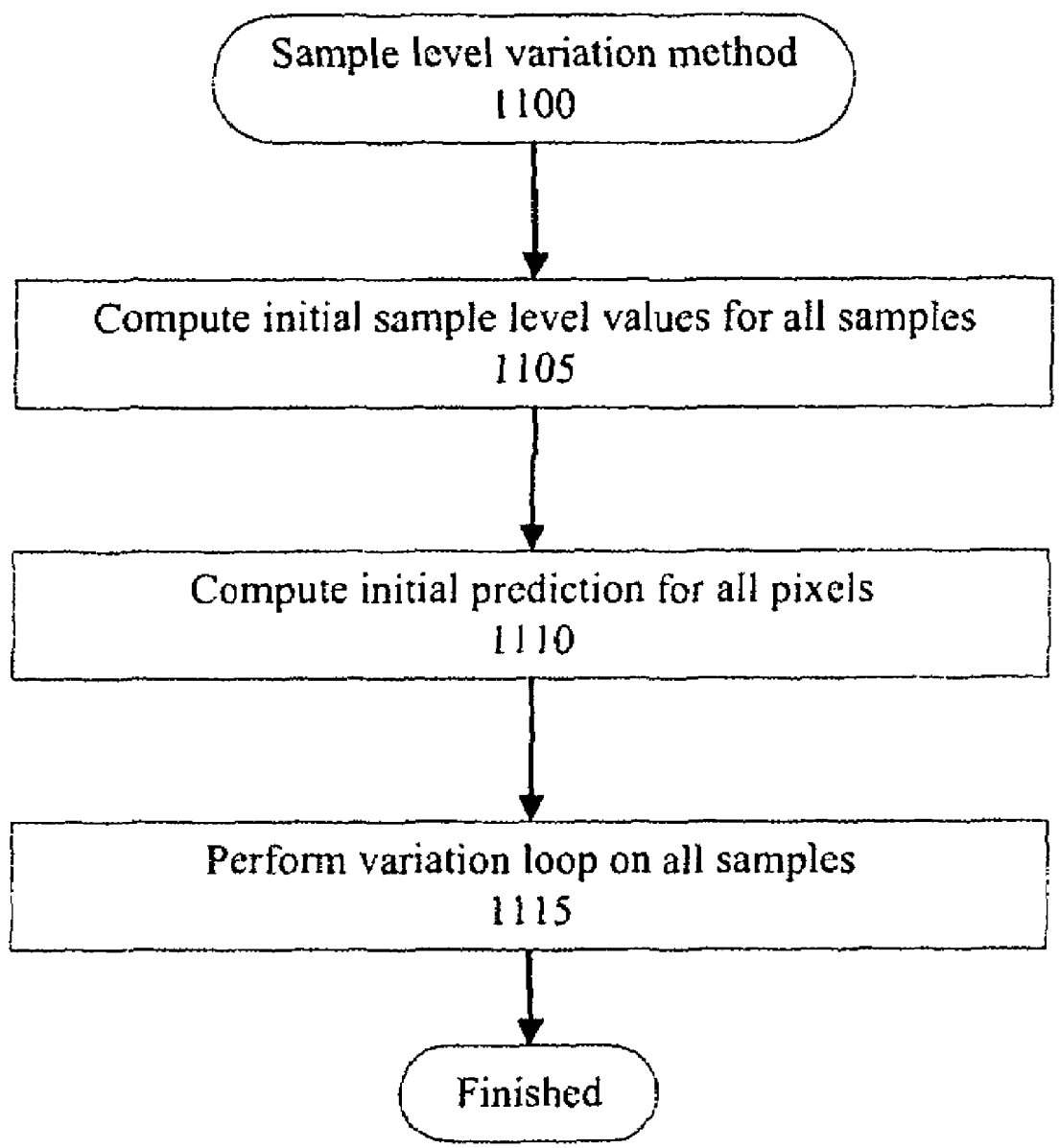
FIG. 11 is a flow diagram illustrating a sample level variation method to be performed by a processor according to an embodiment of the invention.

Turning to FIG. 11, sample level variation method 1100 illustrates one embodiment of the sample level variation performed at block 165 by sub-sampling method 150. At block 1105, the method 1100 computes initial sample level values for all samples in the sampling pattern, where the sample level is represented by $L_k$. In one embodiment of the invention, an initial sample level is computed using an average of pixel data based on the sample pattern, but the invention is not so limited, and other techniques known in the art may be used. At block 1110, the method 1100 computes an initial prediction value for all pixels, where a pixel prediction may represented by $P(\vec{x})$:

$$P(\vec{x}) = \sum_{k \in S(\vec{x})} f_k^{\vec{x}} L_k \quad (2)$$

where $f_k^{\vec{x}}$ is the filter weight coming from sample k for the prediction of pixel $\vec{x}$ and $S(\vec{x})$ is the set of samples included in the prediction for pixel $\vec{x}$. At block 1115, the method 1100 performs the sample variation loop on all samples in the pattern, described in greater detail below in conjunction with FIG. 12. Filter weights are described in greater detail below in conjunction with FIG. 22.

Figure 12:
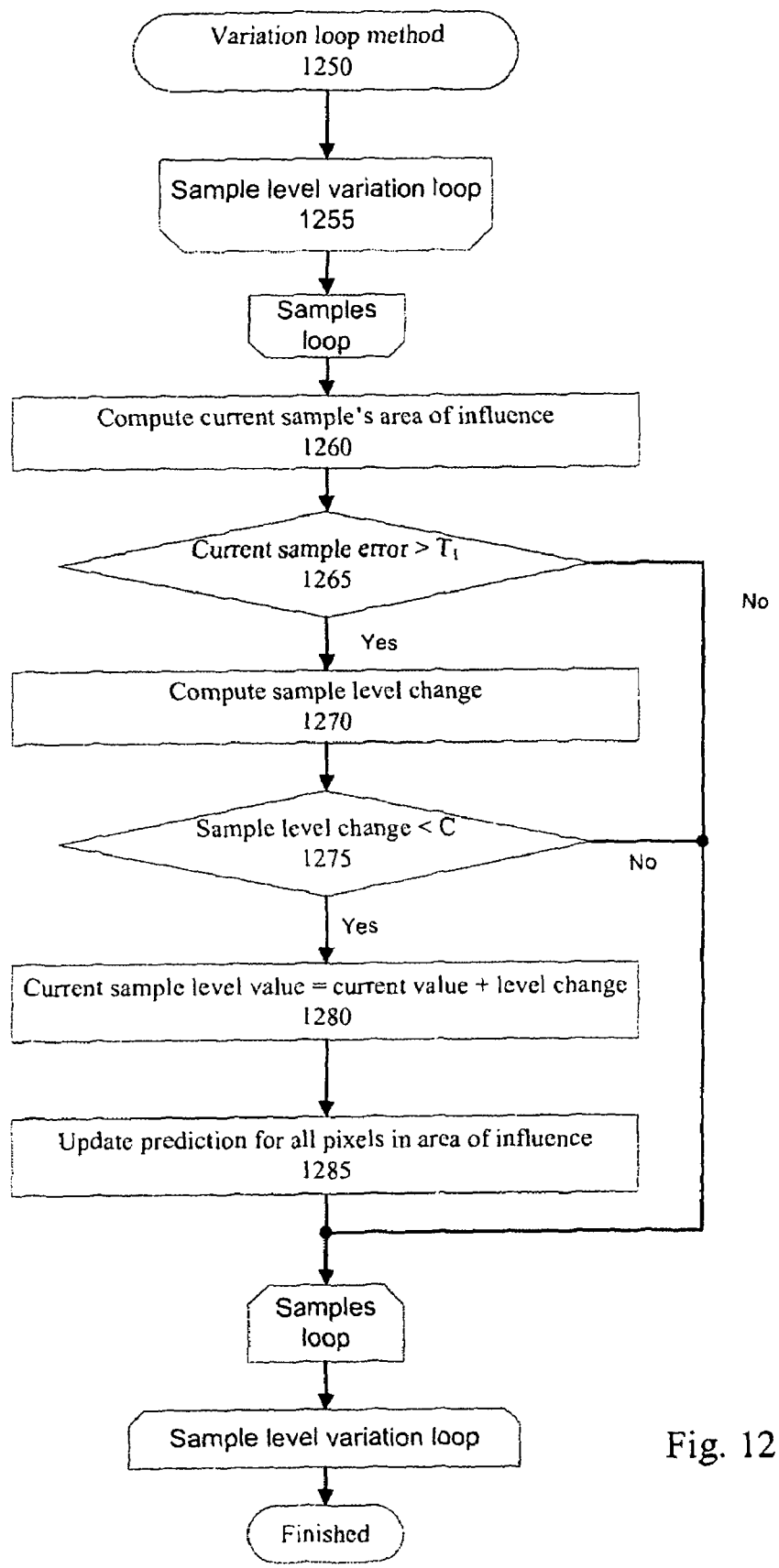
FIG. 12 is a flow diagram illustrating a sample level variation loop to be performed by a processor according to an embodiment of the invention.

Turning to FIG. 12, variation loop 1250 illustrates one embodiment of the sample variation loop performed by the sample level variation method 1100 at block 1115. Sample level variation loop 1255 iterates one or more times depending on a balancing of computational efficiency and visual performance. Generally, visual performance gain saturates around four iterations of the loop 1255.

Figure 13:
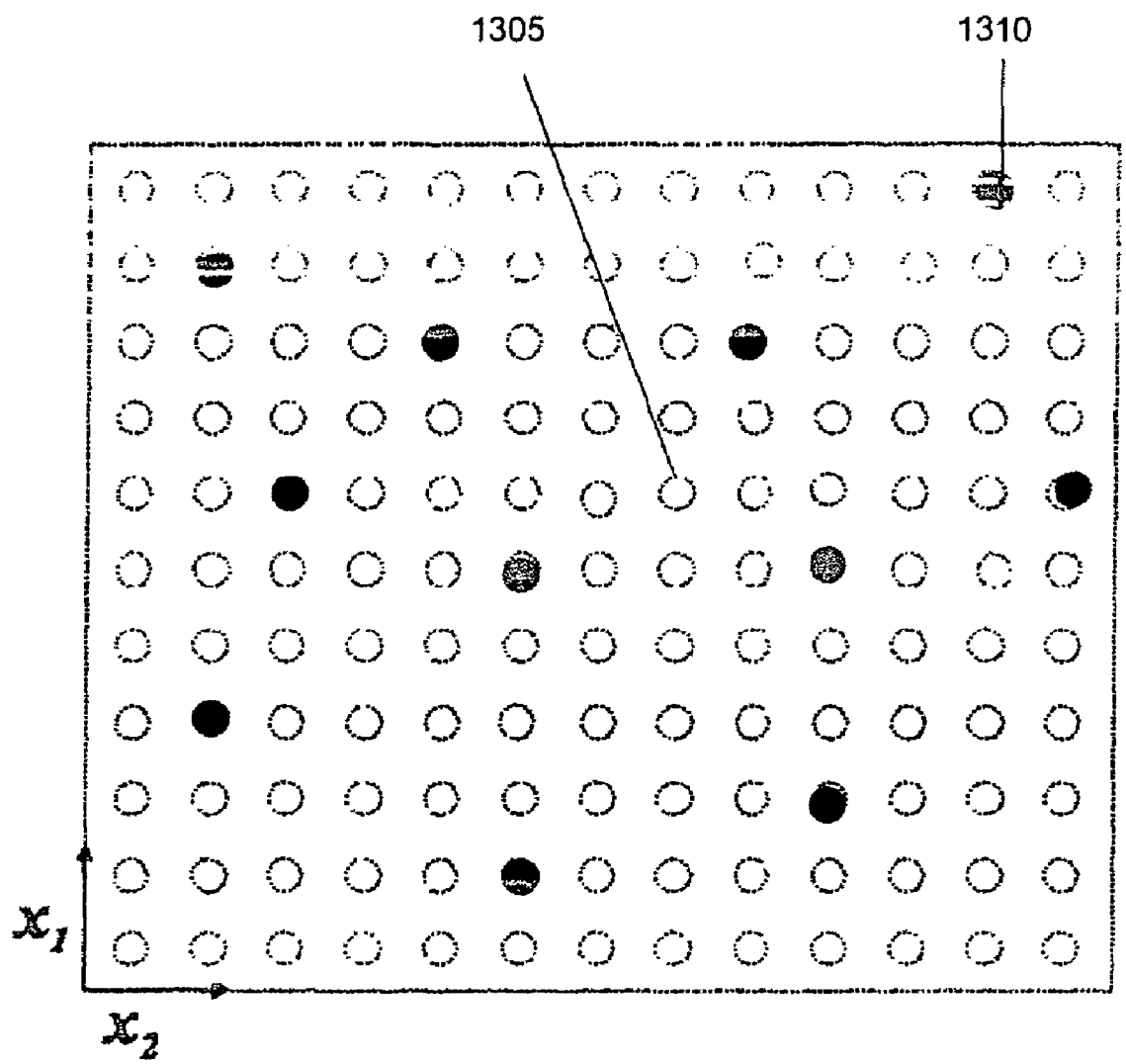
FIG. 13 is an example illustrating samples and pixels according to an embodiment of the invention.
Figure 14:
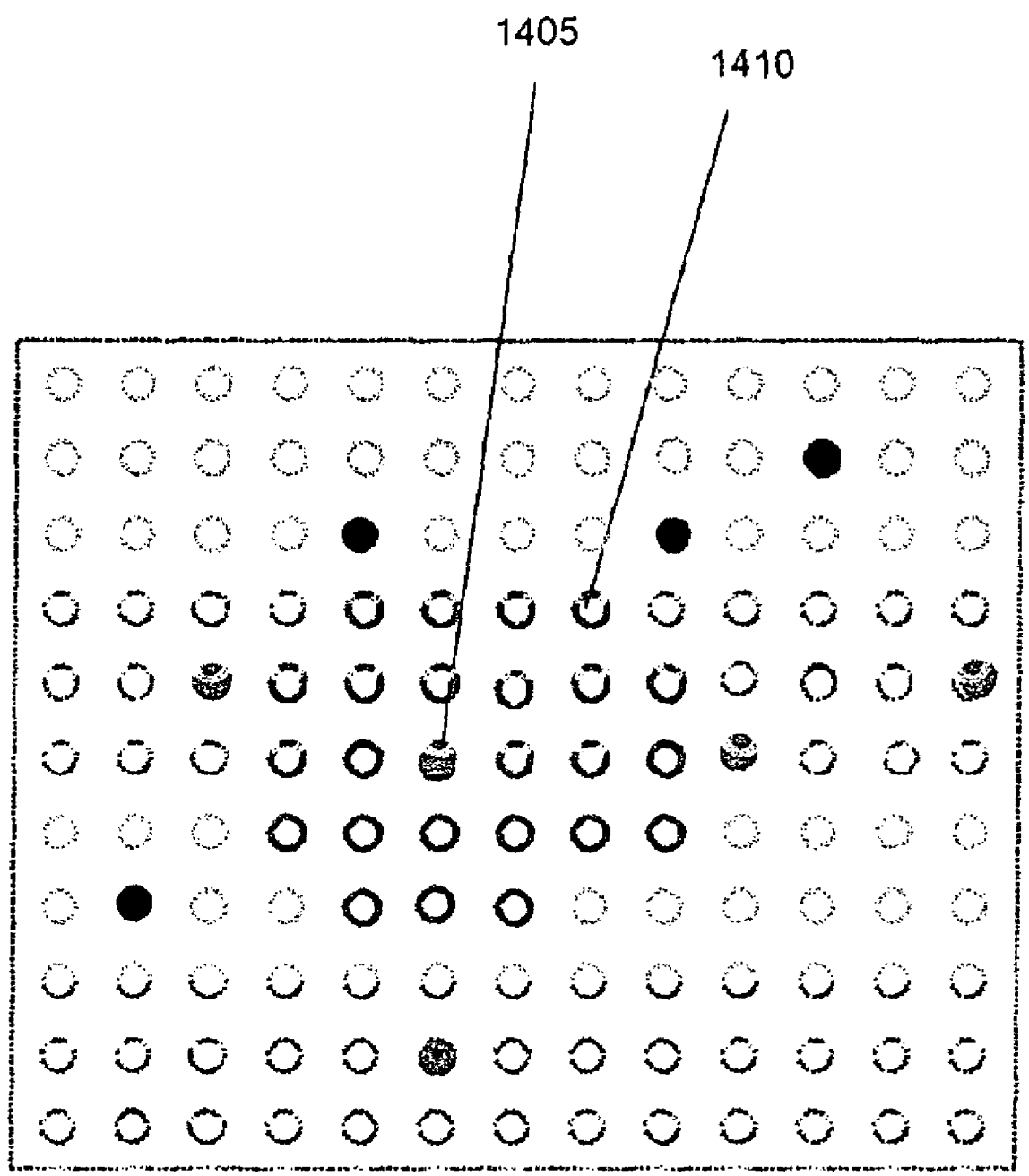
FIG. 14 is an example illustrating samples and the area of influence of a sample according to an embodiment of the invention.

Within each iteration of sample level variation loop 1255, every sample in the pattern is processed. Sample 1310 in FIG. 13 is an example of a sample in a set of pixels, such as pixel 1305. At block 1260, the area of influence of the current sample is computed. For a given sample k, the area of influence A(k) is the set of pixels $\{x\vec{x}\}$ whose prediction $P(\vec{x})$ is influenced by the sample k. In one embodiment, a pixel is included in a sample's area of influence if the corresponding filter weight is greater than zero. In an alternate embodiment, a pixel is included in a sample's area of influence if the corresponding filter weight is greater than a sample influence threshold $T_2$. A higher sample influence threshold produces a smaller area of influence, which reduces the computational complexity of processing dependent upon the quantity of pixels in the area of influence. Sample 1405 in FIG. 14 includes pixel 1410 within its area of influence. A(k) may be defined as follows:

$$A(k) = \{\vec{x}; |f_k^{\vec{x}}| > 0\} \tag{3}$$

At decision block 1265, the current sample error is tested against threshold T. Prediction error e of the data set may be defined as:

$$e = \sum_{i=1}^{N} e_i \tag{4}$$

$$e_i = (I(\vec{x}_i) - P(\vec{x}_i))^2 \tag{5}$$

where $e_i$ is the prediction error for a given pixel $\vec{x}_i$, e is the total prediction error for the N pixels in the image, $I(\vec{x})$ is the level of $\vec{x}_i$ in the original image, and $P(\vec{x})$ is the predicted level of $\vec{x}_i$.

Sample prediction error e(k) is the average prediction error over all pixels in the area of influence for sample k, and may be defined as:

$$e(k) = \frac{1}{N_k} \sum_{\vec{x}_i \in A(k)} e_i \tag{6}$$

where $N_k$ is the number of pixels in the set A(k).

Prediction error threshold $T_1$ is used to balance computational complexity of the invention with the visual performance gain. In one embodiment, the threshold is defined as:

$$e(k) > T_1 \tag{7}$$

Accordingly, decision block 1265 will cause the method 1250 to not process a sample that has an error less than or equal to the threshold. In this way, embodiments of the invention may be optimized for various computational and visual performance requirements. An embodiment that is sensitive to computational complexity would use a higher value for $T_1$, while an embodiment sensitive to visual performance would use a lower value for $T_1$.

At block 1270, the method 1250 computes a sample level change $\Delta(k)$ for the current sample k. The sample level change $\Delta(k)$ is the result of a local minimization of the sample prediction error, and may be defined as follows:

$$\Delta(k) = \frac{\sum_{\vec{x} \in A(k)} (I(\vec{x}) - P(\vec{x})) f_k^{\vec{x}}}{\sum_{\vec{x} \in A(k)} f_k^{\vec{x}} f_k^{\vec{x}}} \tag{8}$$

By computing the sample level change directly, the method 1250 avoids the need for searching for a local minimum over a range of values. This provides a significant reduction in computational complexity, since computing a large range of potential values need not be performed. At decision block 1275, the sample level change is measured against level change threshold C to provide a restriction on the magnitude of a sample level change. The method 1250 uses C to restrict the possible change in sample value, to prevent the formation of instability or visual artifacts in the data set. At block 1280, the method 1250 assigns a new value to the current sample level based on the sample level change. At block 1285, the method 1250 updates the prediction for all pixels in the area of influence A(k) of the current sample using the new sample level value.

Referring back to FIG. 1B at blocks 160 and 165, sub-sampling method 150 performs adaptive filtering and sample level variation across the entire image. As described above, sample movement method 500 performs adaptive filtering and local sample level variation at blocks 535 and 540 and sample removal method 700 performs adaptive filtering and local sample level variation at blocks 725 and 730. Both sample movement and sample removal result in changes to the overall sample pattern, making further reduction of pixel prediction error possible through adaptive filtering and sample level variation. The localized filtering performed by the sample movement and removal methods is local in the sense that only pixels in the areas of influence of samples affected by the methods are filtered and varied. In this way, the invention uses adjustments of the sample pattern as opportunities to optimize the predictive strength of the adjusted sample pattern. This organic solution provides a significant improvement in visual performance over prior art techniques.

Figure 15:
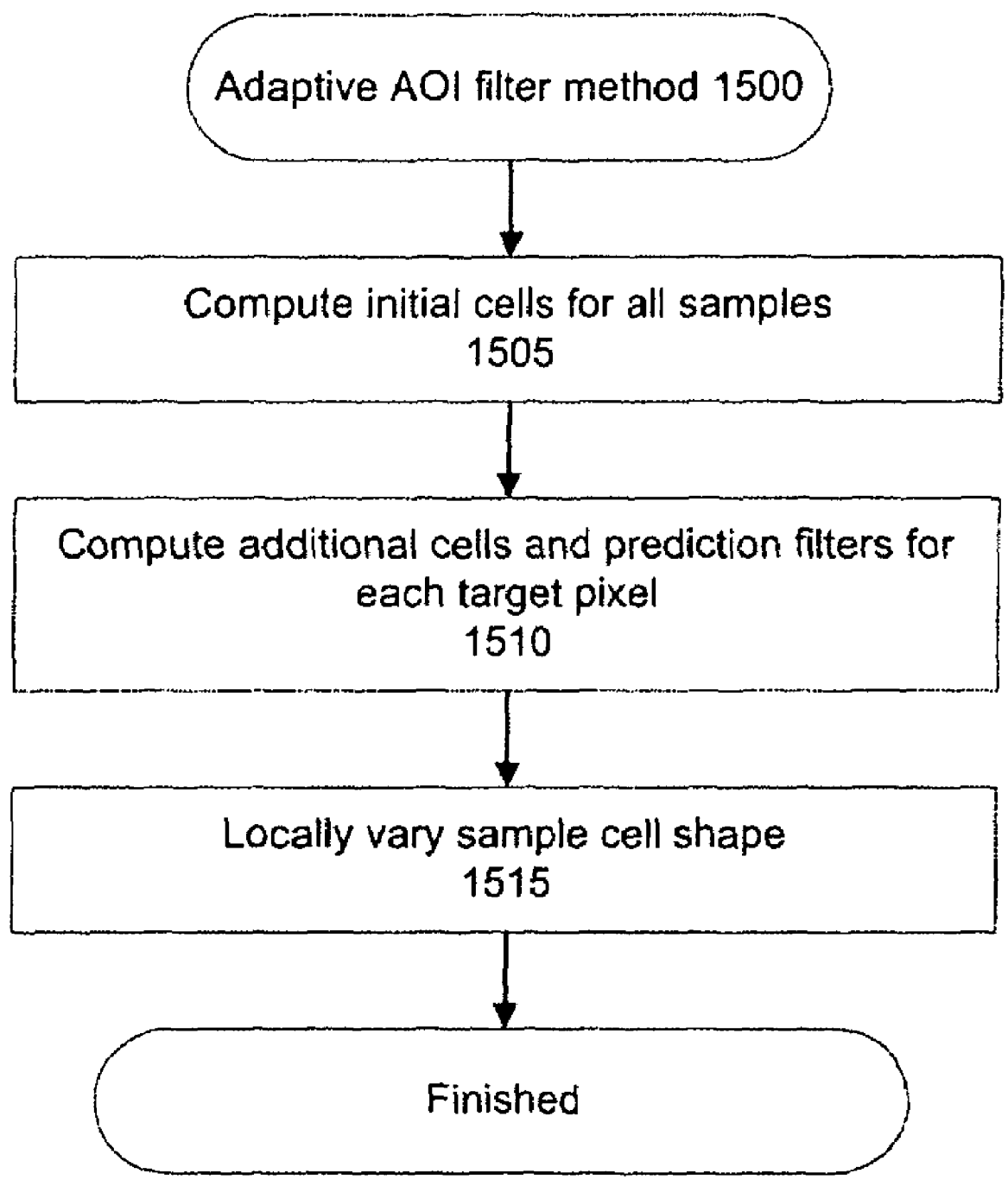
FIG. 15 is a flow diagram illustrating an adaptive area of influence filter method to be performed by a processor according to an embodiment of the invention.
Figure 16:
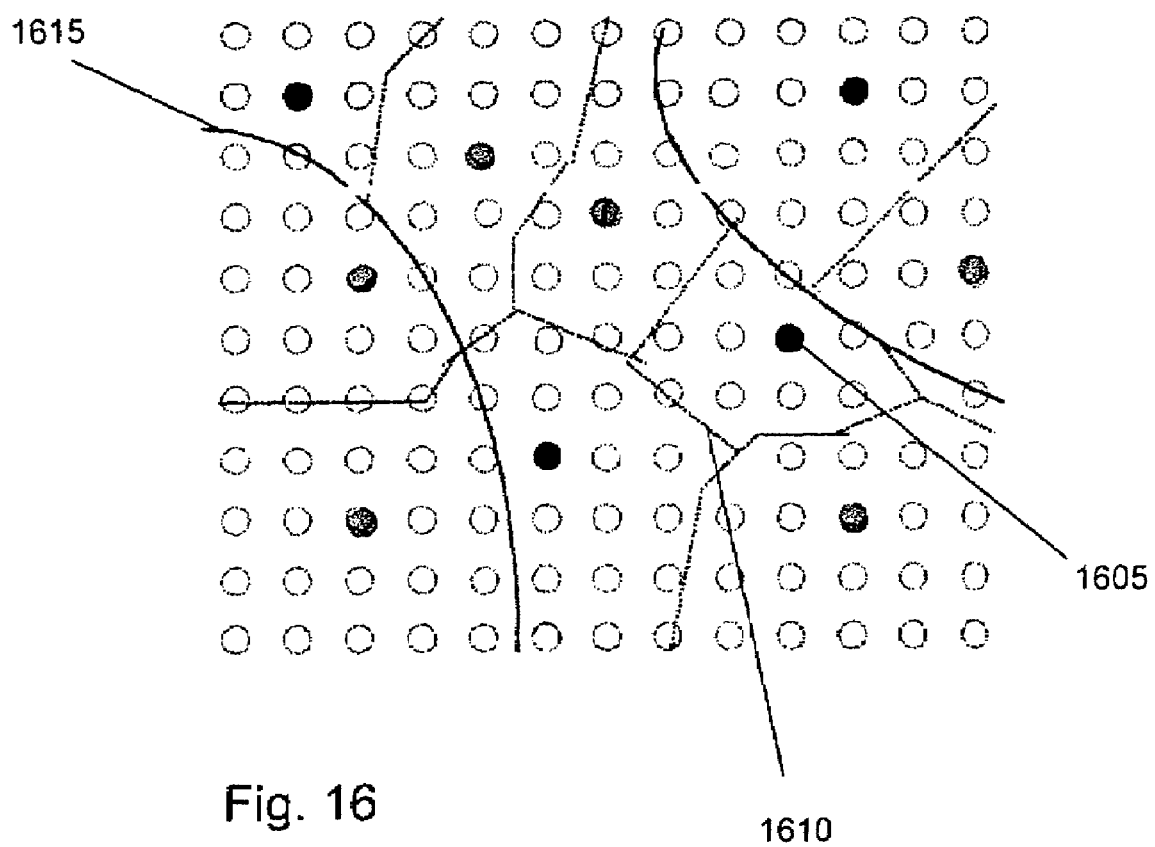
FIG. 16 is an example of the sample cells for a set of samples. The modification of the sample cells from motion/object/texture boundary is also shown.

Turning to FIG. 15, adaptive area of influence filter method 1500 illustrates one embodiment of an adaptive filter applied at block 160 by the method 150. At block 1505, the method 1500 computes initial sample cells for each sample in the sample pattern, described in greater detail below in conjunction with FIG. 18. As an example, sample 1605 in FIG. 16 may be given an initial sample cell defined by sample cell boundary 1610. Sample cells may also conform to the contours of motion, object and texture class boundaries such as boundary 1615. At block 1510, the method 1500 computes additional cells and prediction filters for each target pixel and extracts optimal filter parameters, described below in greater detail in conjunction with FIG. 22. At block 1515, the method 1500 locally varies sample shape, described below in greater detail in conjunction with FIG. 28.

Figure 17:
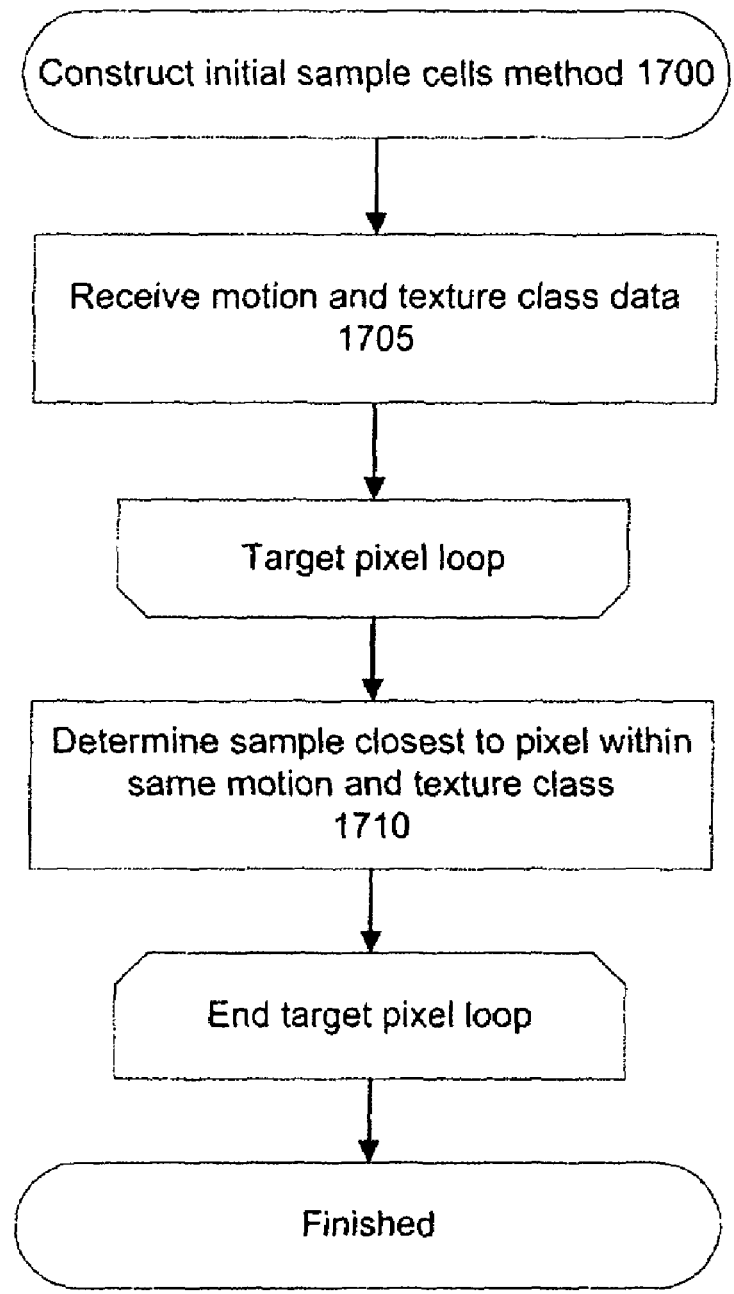
FIG. 17 is a flow diagram illustrating an initial sample cell construction method to be performed by a processor according to an embodiment of the invention.

Turning to FIG. 17, initial sample cell construction method 1700 illustrates one embodiment of block 1505 as performed by the method 1500. The method 1700 associates every sample in the sample pattern with a sample cell. In one embodiment, a sample cell criteria is that initial sample cells contain the pixels closest to a given sample. At block 1705, the method 1700 receives motion and texture class data related to the current pixel data set. At block 1710, for target pixel in the pixel data set, the method 1700 determines the sample closest to the pixel within the same motion and texture class. In one embodiment, pixel-to-sample distance $\text{dist}_k(\vec{x})$ is defined as:

$$\text{dist}_s(\vec{x}) = \gamma_k(x_1 - x_1(k))^2 + \beta_k(x_2 - x_2(k))^2 \tag{9}$$

where $$\vec{x} = (x_1, x_2) \tag{10}$$

is a pixel in the image, and k is a sample with the position $$\vec{x}(k) = (x_1(k), x_2(k)) \tag{11}$$

and $\gamma_k$ and $\beta_k$ are parameters varying the shape of the sample cell. Sample cell shape is described in greater detail below in conjunction with FIG. 28.

Sample$_{min\_dist}(\vec{x})$ represents the sample which has the smallest pixel-to-sample distance dist$_k(\vec{x})$ to the pixel $\vec{x}$. Dist$_{min}^0(\vec{x})$ is the value of this minimum pixel-to-sample distance. In one embodiment, the minimum pixel-to-sample distance for a pixel is defined as:

$$\text{Dist}_{min}^0(\vec{x}) = \text{dist}_{k'}(\vec{x}) \quad (12)$$

where the nearest sample k'=Sample$_{min\_dist}(\vec{x})$. The quantity Sample$_{min\_dist}(\vec{x})$ may have multiple values, since a pixel may be located at the minimum pixel-to-sample distance from more than one sample.

Accordingly, a sample cell $C_k$ may be defined as:

$$C_k = \{\vec{x} | \text{Sample}_{min\_dist}(\vec{x}) = k, T(\vec{x}) = T(k), M(x) = M(k)\} \quad (13)$$

which states that the sample cell for a sample k contains pixels that are closest to it and have the same texture and motion class. Texture class of a pixel is referred to as $T(\vec{x})$, while the motion class of a pixel is referred to as $M(\vec{x})$.

Figure 18:
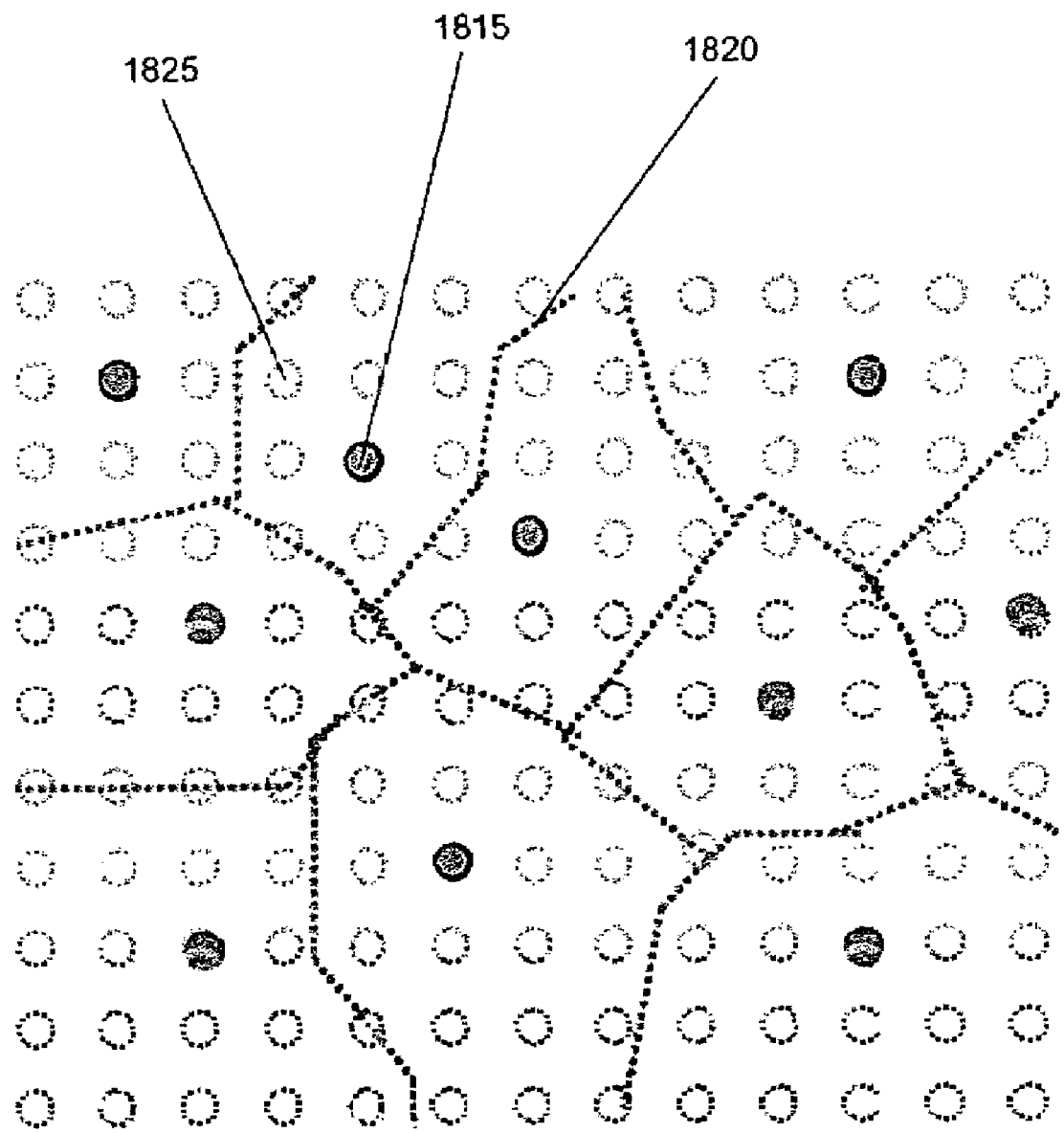
FIG. 18 is an example illustrating samples and sample cells according to an embodiment of the invention.
Figure 19A:
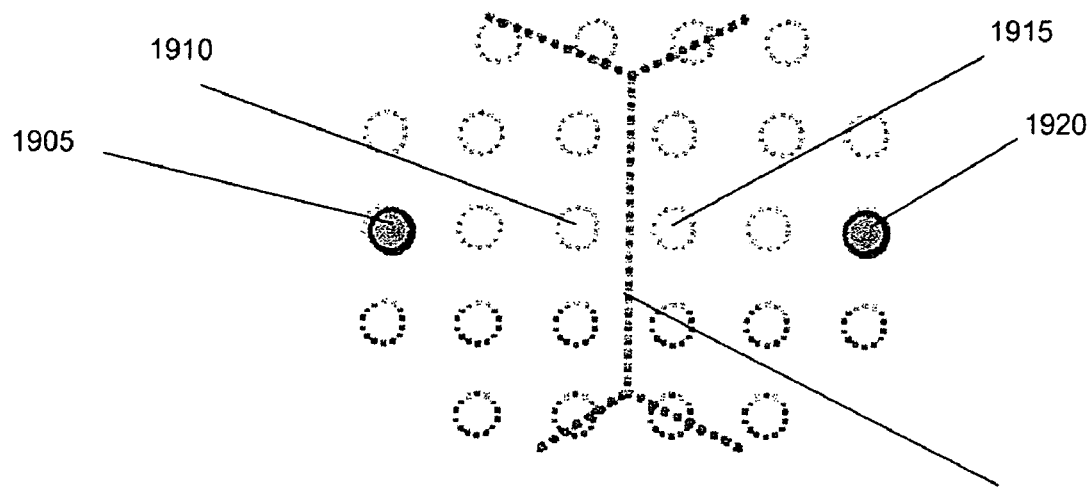
FIG. 19A is an example illustrating non-overlapping sample cell boundaries according to an embodiment of the invention.

For example, in FIG. 18, sample 1815 is associated with the sample cell defined by cell boundary 1820. Each pixel belongs to one or more cells. Pixel 1825 belongs to sample cell boundary 1820, which is associated with sample 1815. Each pixel has a membership value associating the pixel with a sample. The pixel membership value depends upon how many sample cell boundaries the pixel occurs beneath. For example, pixel 1910 in FIG. 19A is within the boundary of the sample cell associated with sample 1905, just as pixel 1915 is within the boundary of the sample cell associated with sample 1920. The borders 1925 between the sample cells are non-overlapping. As a result, pixel 1910 as associated with sample 1905 will have a membership value of 1. Similarly, pixel 1920 as associated with sample 1920 will have a membership value of 1. By contrast, pixel 1920 as associated with sample 1905 will have a membership value of 0, since the pixel has no association with the sample cell associated with sample 1905.

Figure 19B:
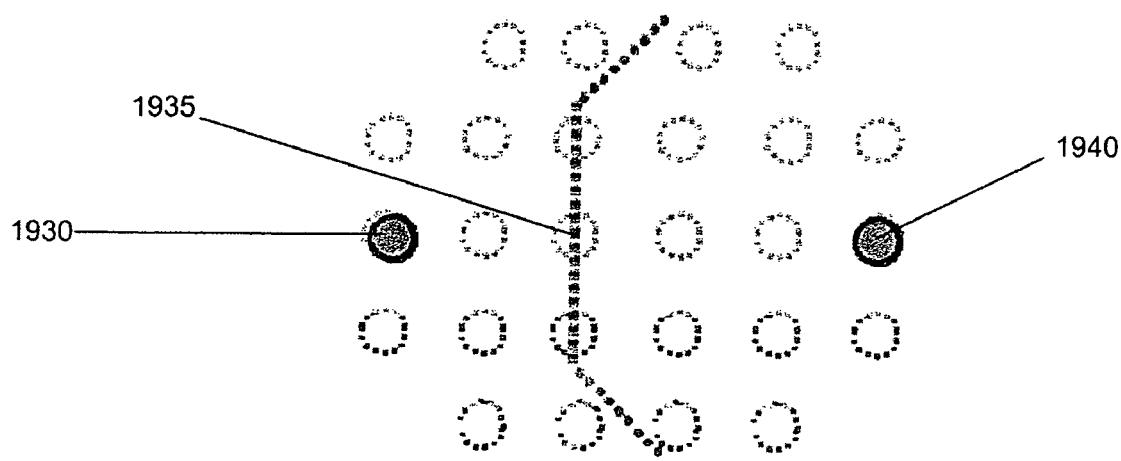
FIG. 19B is an example illustrating a sample cell boundary occurring over a pixel according to an embodiment of the invention.
Figure 19C:
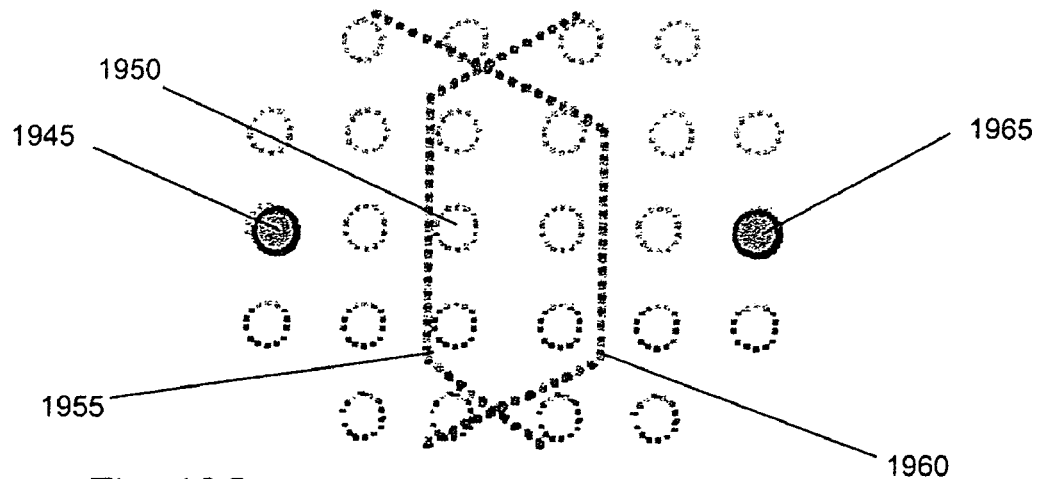
FIG. 19C is an example illustrating overlapping sample cell boundaries according to an embodiment of the invention.

In FIG. 19B, the borders between the sample cells associated with samples 1930 and 1940 lie upon pixel 1935. Thus, the membership value of pixel 1935 as associated with sample 1930 would be ½. Similarly, the membership value of pixel 1935 as associated with sample 1940 would also be ½, since the association of pixel 1935 is divided between both samples. In FIG. 19C, sample cell boundary 1960, associated with sample 1945, overlaps with sample cell boundary 1955, associated with sample 1965. Accordingly, pixel 1950 as associated with sample 1945 will have a membership value of 1, as will pixel 1950 as associated with sample 1965.

Figure 20:
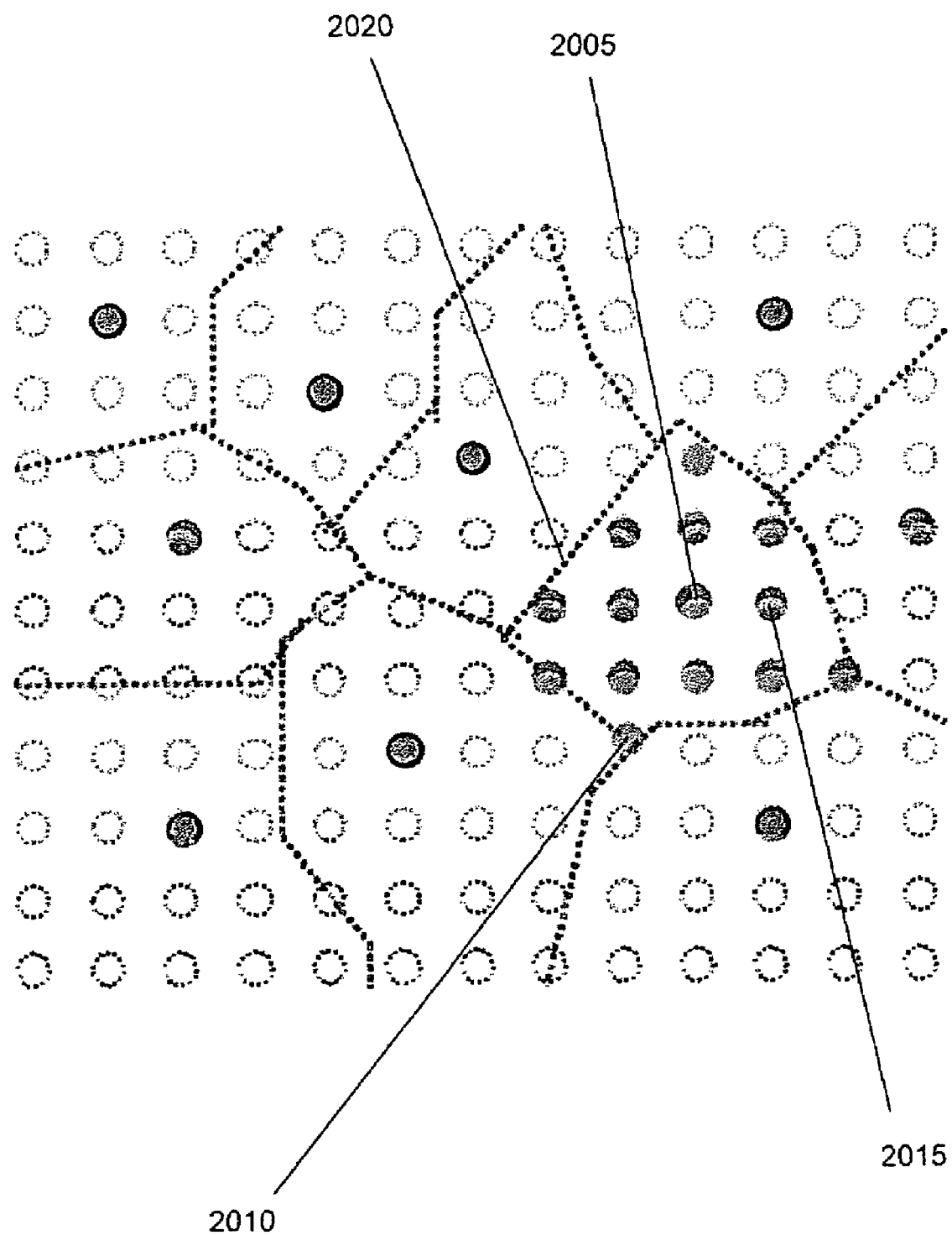
FIG. 20 is an example illustrating a sample partition including pixels occurring under a sample cell boundary.

FIG. 20 illustrates an example of initial sample cell construction. The method 1800 associates sample 2005 with sample cell 2020, which includes pixels 2010 and 2015. Pixel 2010 as associated with sample 2005 has a membership value of ⅓ because it lies under the sample cell boundary corresponding to three samples. Pixel 2015 as associated with sample 2005 has a membership value of 1.

Figure 21A:
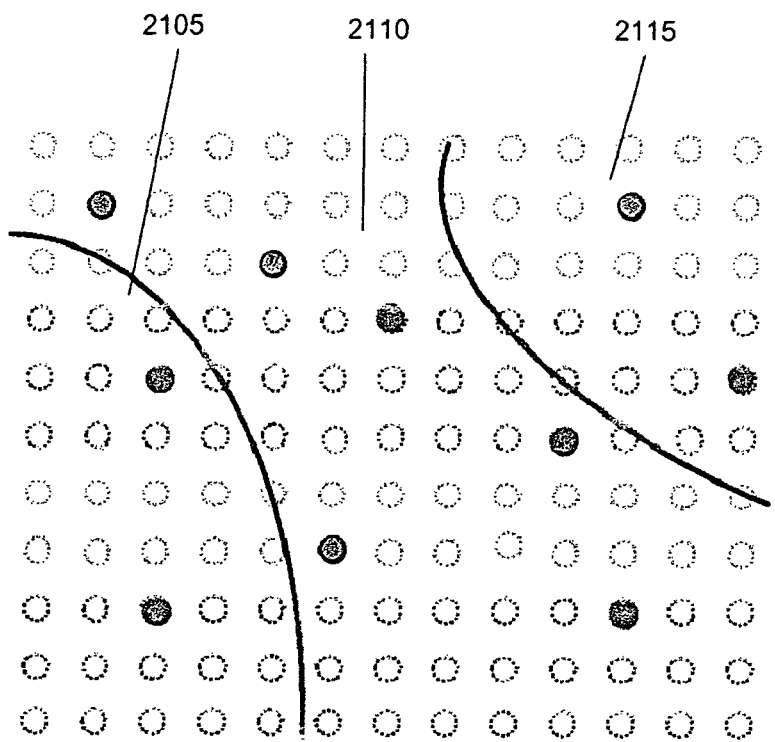
FIG. 21A is an example illustrating objects separated by object boundaries according to an embodiment of the invention.
Figure 21B:
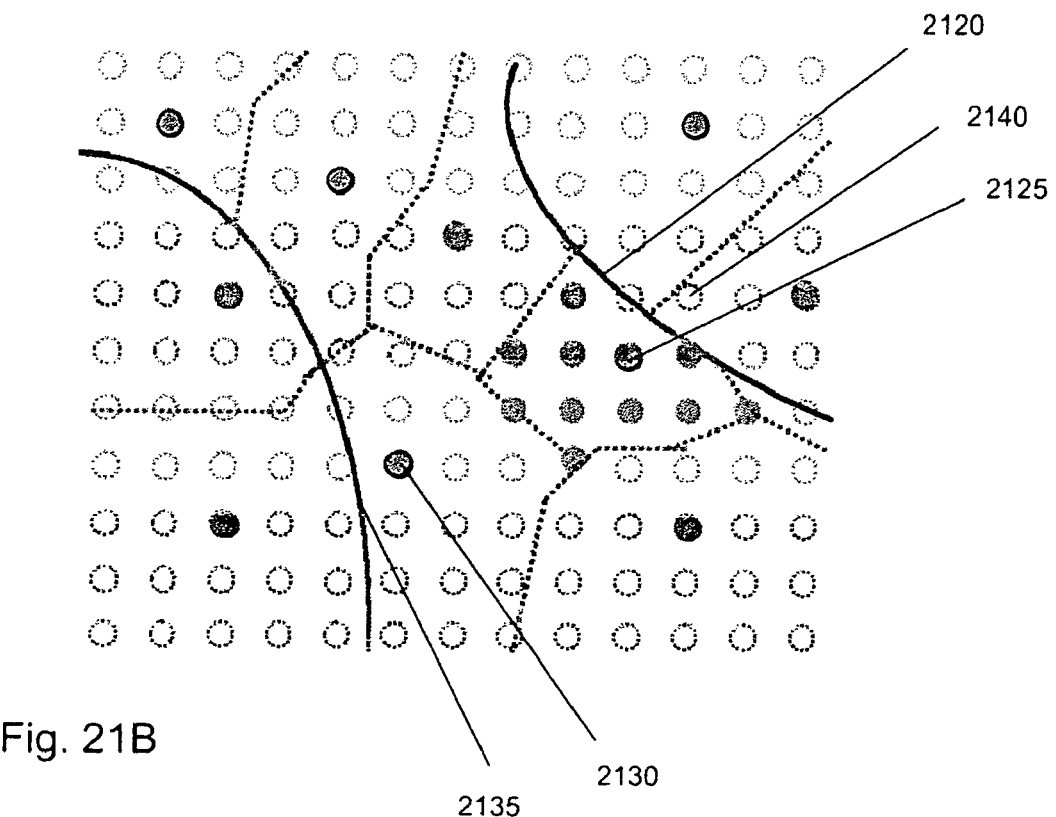
FIG. 21B is an example of sample cells modified by object boundaries according to an embodiment of the invention.

FIGS. 21A and 21B illustrate examples of motion and texture objects and the interaction of those objects with sample cells. Objects 2105, 2110, and 2115 are received at block 1805 of initial sample cell constriction method 1800. In one embodiment, a pre-processor (not shown) generates objects 2105, 2110, and 2115 according to one or more techniques known in the art. Samples 2125 and 2130 both have sample cells influenced by object boundaries 2120 and 2135.

Texture and/or motion objects provide additional insight into the strength of particular samples. For example, pixel 2140 is close, distance-wise, to sample 2125. Accordingly, if the predictive power of sample 2125 were judged solely by distance to pixel 2140, the apparent predictive strength would be high. However, as indicated by object boundary 2120, pixel 2140 may, for example, be a background (a wall) while sample 2125 represents something moving in front of the wall (a person). Thus, using object boundaries to influence the size and shape of pixel cells enhances the predictive strength of the sample set. The predictive strength of the sample set is an aggregate of the predictive strength of the individual samples in the sample set.

Figure 22:
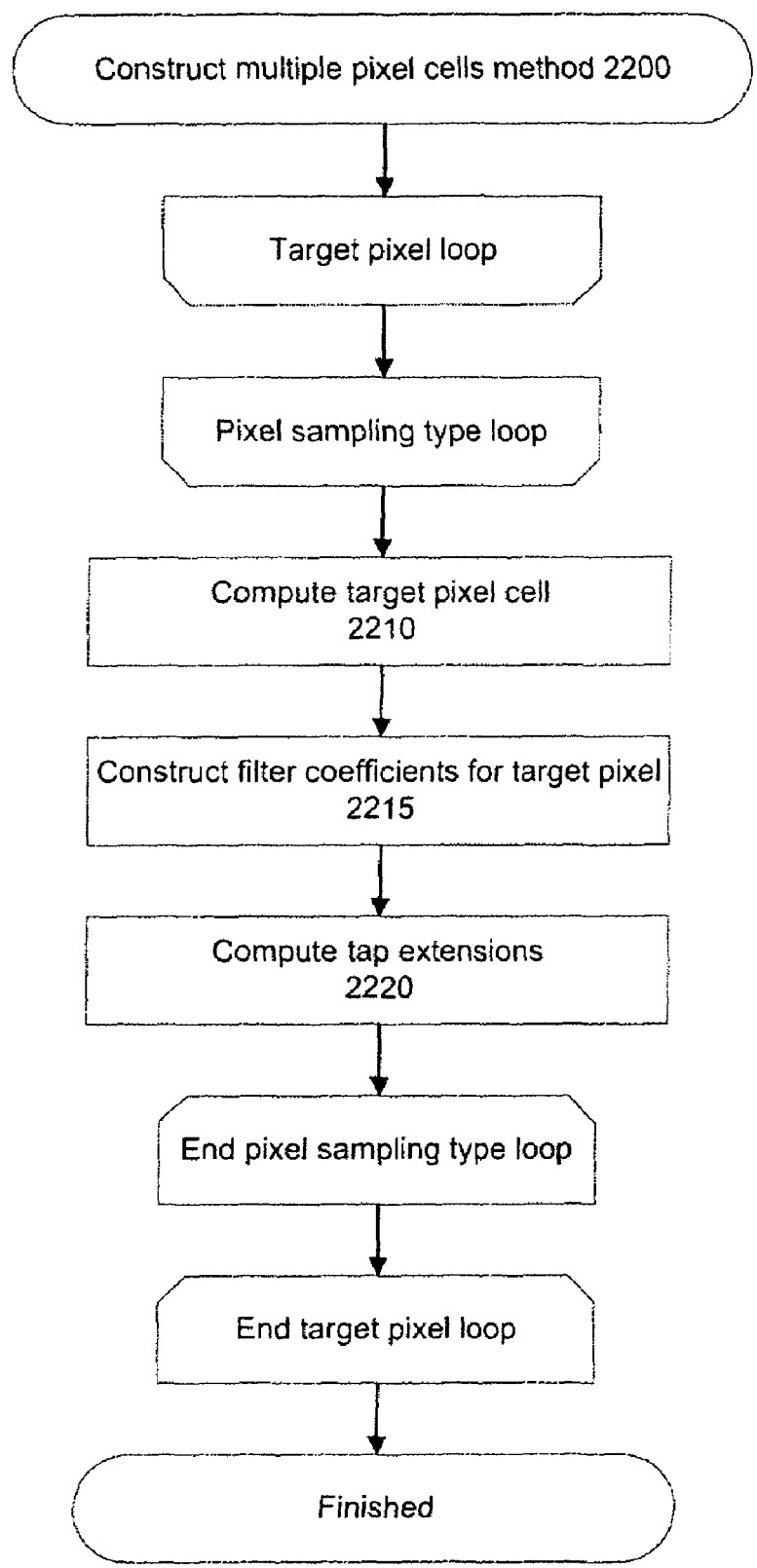
FIG. 22 is a flow diagram illustrating a multiple pixel cell construction method to be performed by a processor according to an embodiment of the invention.

Turning to FIG. 22, construct multiple pixel cells method 2200 illustrates one embodiment of the additional cell and filter construction method 1510. At block 2210, the method 2200 computes the target pixel cell $C_{\vec{x}}^{i0}$ according to the following target pixel cell criteria:

$$C_{\vec{x}}^{i0} = \{\vec{x}\,' \in Win(\vec{x}) | \text{dist}(\vec{x}, \vec{x}\,') \leq \text{Dist}_{min}^0(\vec{x}\,'),$$
$$T(\vec{x}\,') = T(\vec{x}\,'), M(\vec{x}\,') = M(\vec{x})\} \quad (14)$$

where $\vec{x}\,'$ represents the pixels contained in the sampling window determined by the sampling type i. A window Win$(\vec{x})$, of fixed size is placed around the target pixel. The method uses a set of pixel sampling types to scan the pixels $\vec{x}\,'$ in the window. Sampling windows and sampling types are discussed in greater detail below in conjunction with FIGS. 23A-23G. Distance is measured as follows:

$$\text{dist}(\vec{x}, \vec{x}\,') = (x_1 - x_1')^2 + (\vec{x}_2 - \vec{x}_1)^2 \quad (15)$$

where $x_1$ and $x_1'$ represent coordinates on a vertical axis and $x_2$ and $x_2'$ represent coordinates on a horizontal axis.

At block 2215, the method 2200 computes filter coefficients for the target pixel. The method computes weight factor $W_k^{\vec{x},i0}$ for each sample k. The method initializes the weight factor for a sample k to zero. The method then increments the weight factor by Mem$_k$ for each pixel $\vec{x}\,'$ in the target pixel cell that belongs to the set:

$$C_k \cap C_{\vec{x}}^{i0} \quad (16)$$

(i.e., pixels that belong to both the sample cell and the target pixel cell). The method may compute the weight factor as follows:

$$W_k^{\vec{x},i0} = \sum_{\vec{x}\,' \in C_k \cap C_{\vec{x}}^{i0}} Mem_k(\vec{x}\,') \quad (17)$$

where $\vec{x}\,'$ is refers to all pixels in the target pixel cell ($\vec{x}\,' \in C_{\vec{x}}^{i0}$). Equation 16 is roughly the intersection of the pixel cell and the sample cell. In one embodiment, the filter tap $S_{i0}(\vec{x})$ for pixel $\vec{x}$ is the set of samples k which have a nonzero value of $W_k^{\vec{x},i0}$, defined as follows:

$$S_{i0}(\vec{x}) = \{k | W_k^{\vec{x},i0} > 0\} \quad (18)$$

The filter coefficient $f_k^{\vec{x},i0}$ from sample k for target pixel $\vec{x}$ with sampling type i may be computed as follows:

$$f_k^{\vec{x},i0} = \frac{W_k^{\vec{x},i0}}{Norm} \quad (19)$$

where Norm is a constant obtained from the following normalization constraint:

$$\sum_{S_{io}(\vec{x})} f_k^{\vec{x},io} = 1 \quad (20)$$

Examples of filter coefficient computation are described below in conjunction with FIG. 25. At block 2220, the method 2200 computes tap extensions for the current sampling type. Tap extensions expand the filter tap $S_{i0}(\vec{x})$ to include samples further away from the target pixel $\vec{x}$. Computing tap extensions is discussed in greater detail below in conjunction with FIG. 26.

Figure 23A:
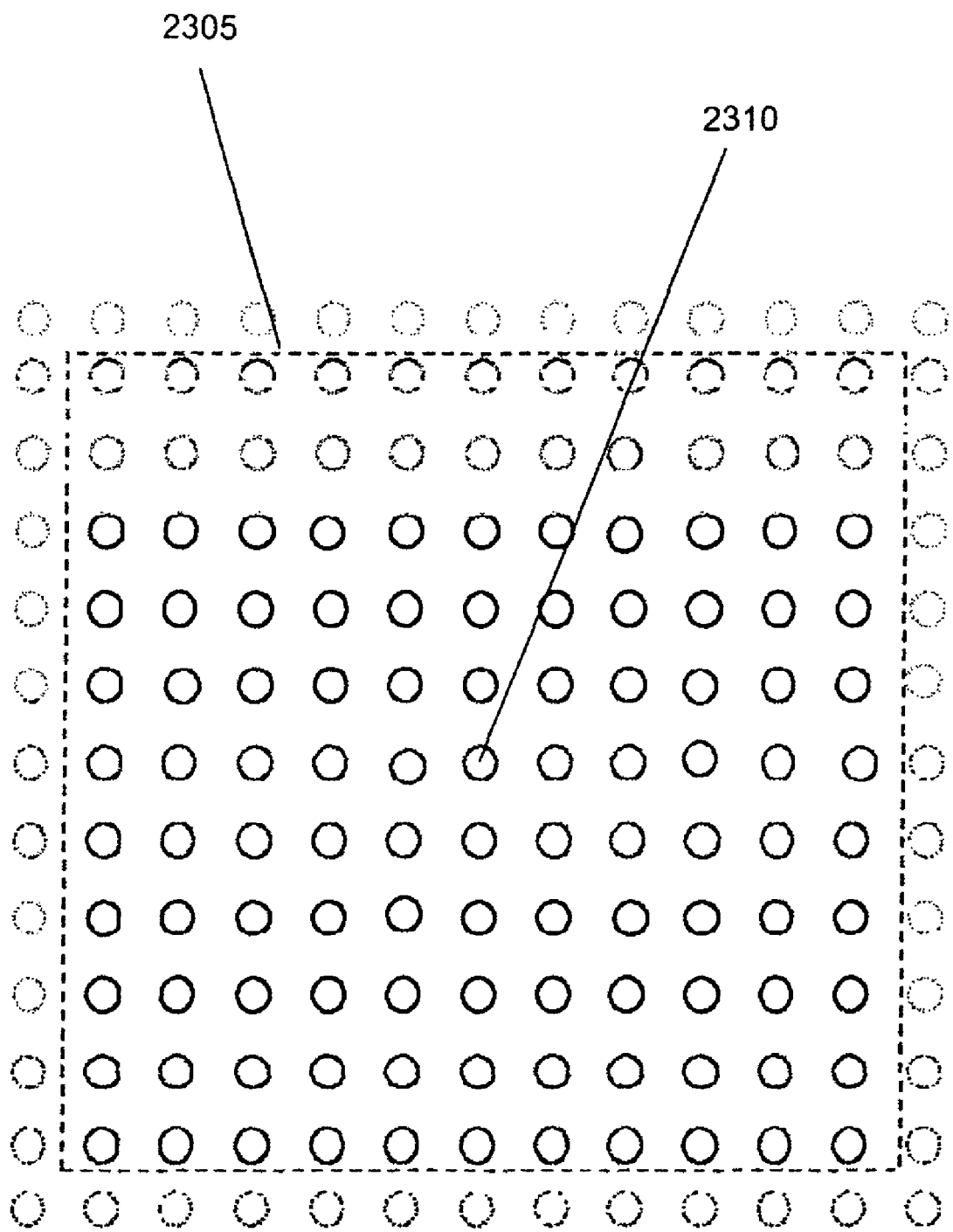
FIGS. 23A-23G are examples illustrating pixel sampling types according to various embodiments of the invention.
Figure 23B:
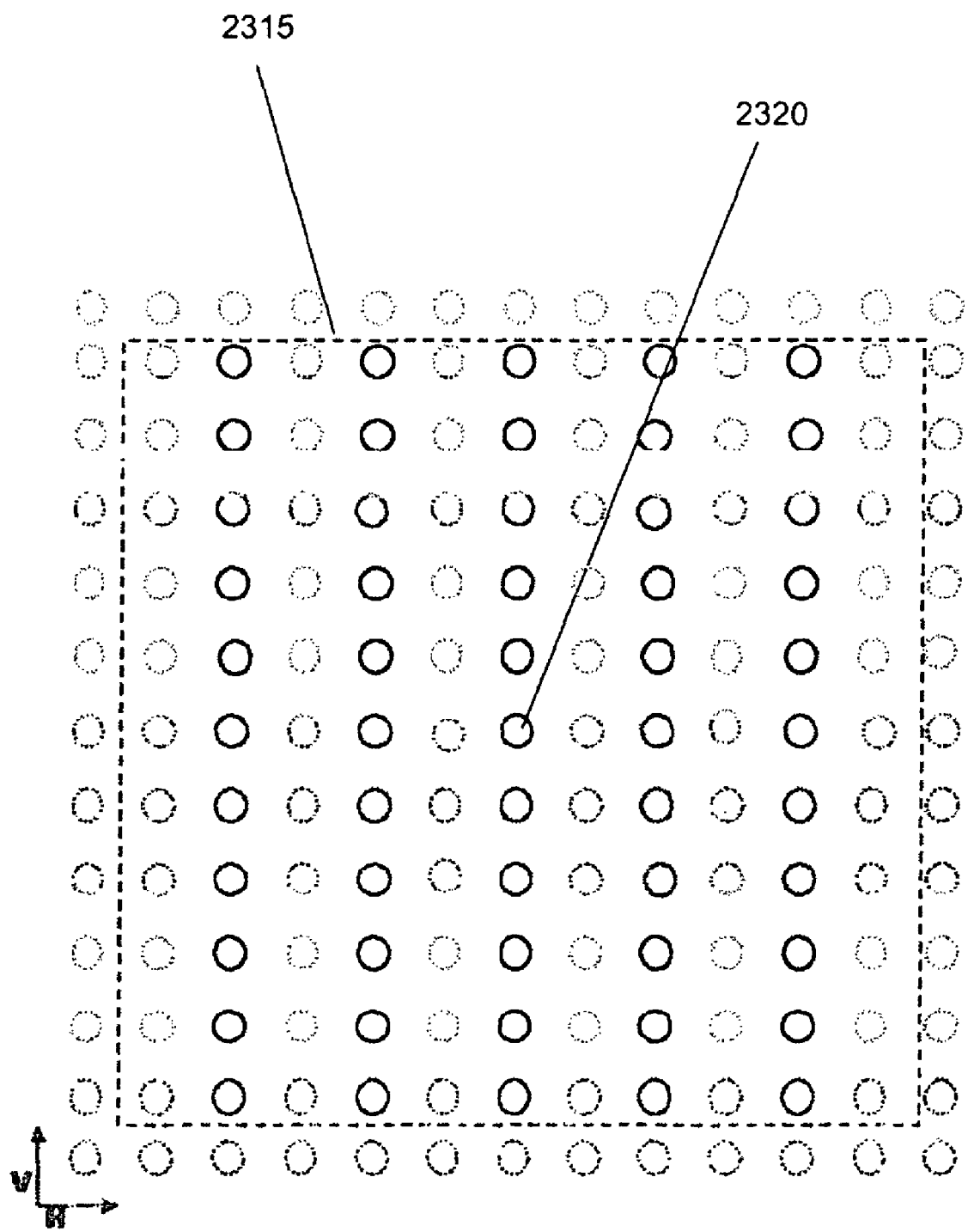
Figure 23C:
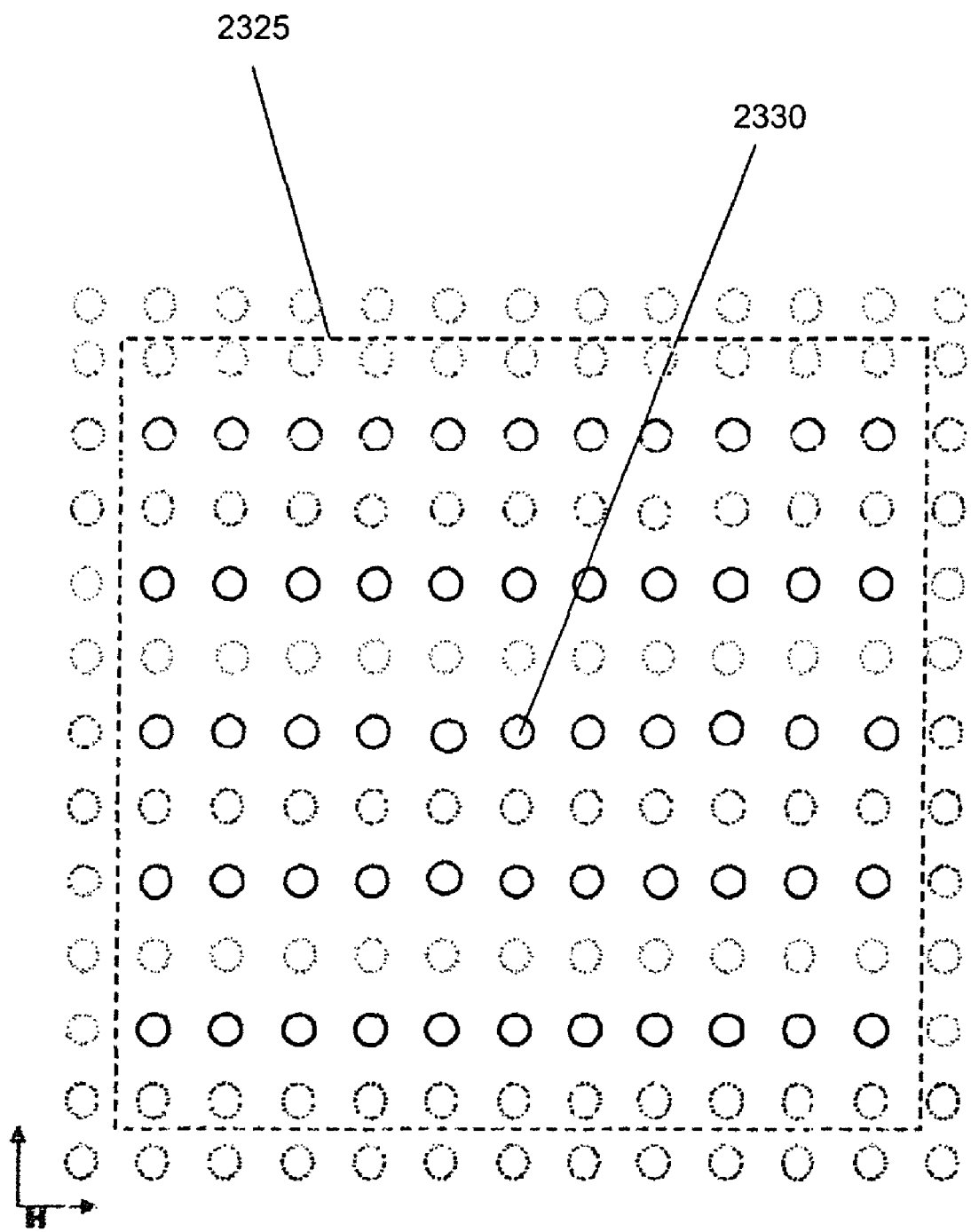

FIGS. 23A-G illustrate examples of sampling types according to various embodiments of the invention. Target pixel 2310 in FIG. 23A is centered in sample window 2305. FIG. 23A illustrates a sampling type using 1×1 scanning, that is, every pixel in the window is included in the set of pixels $\vec{x}'$. Target pixel 2320 in FIG. 23B is centered in sample window 2315. FIG. 23B illustrates a sampling type using 2×1 horizontal scanning, that is, alternating columns of pixels. Target pixel 2330 is centered in sample window 2325. FIG. 23C illustrates a sampling type using 2×1 vertical scanning, that is, alternating rows of pixels.

Figure 23D:
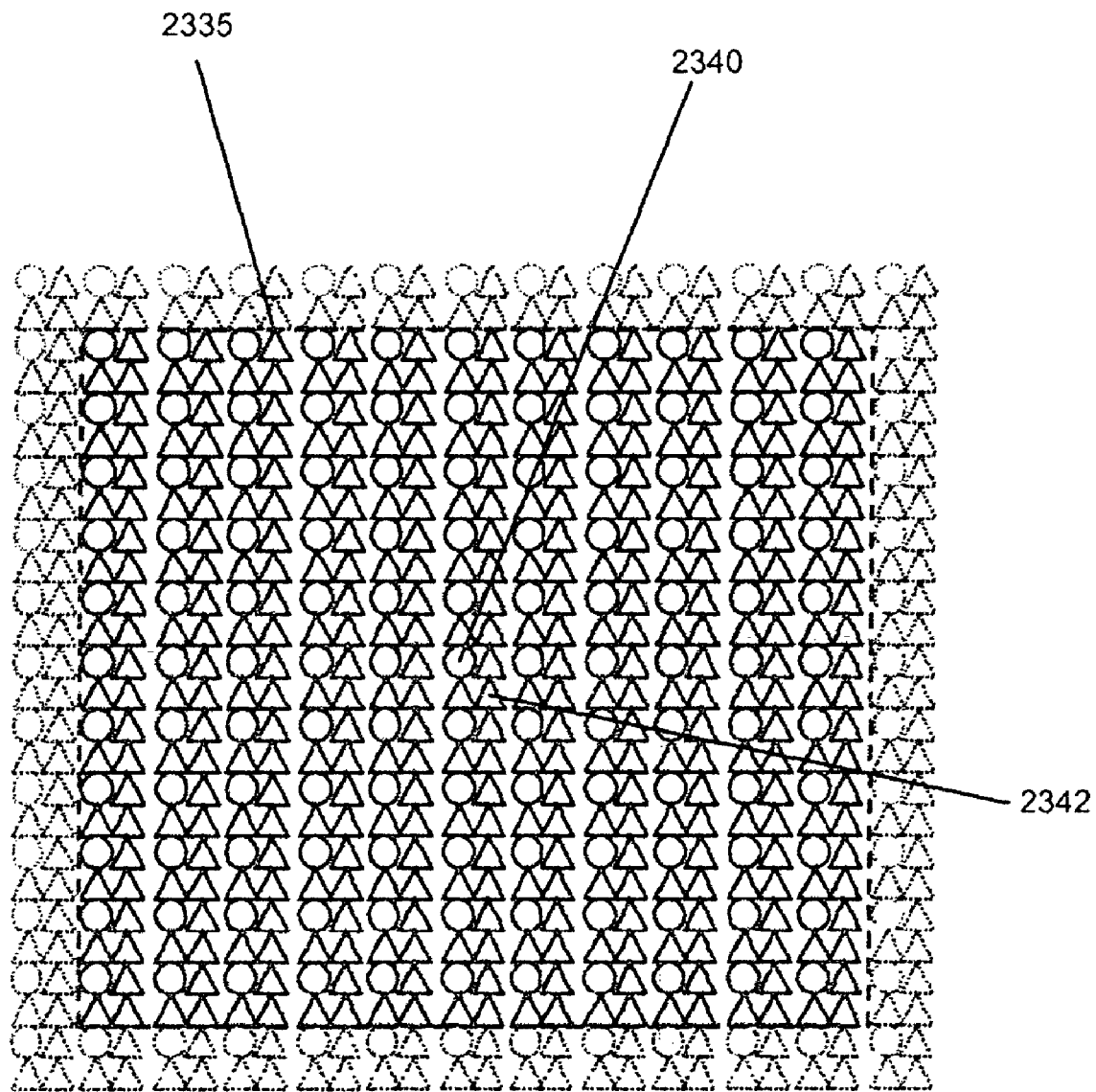
Figure 23E:
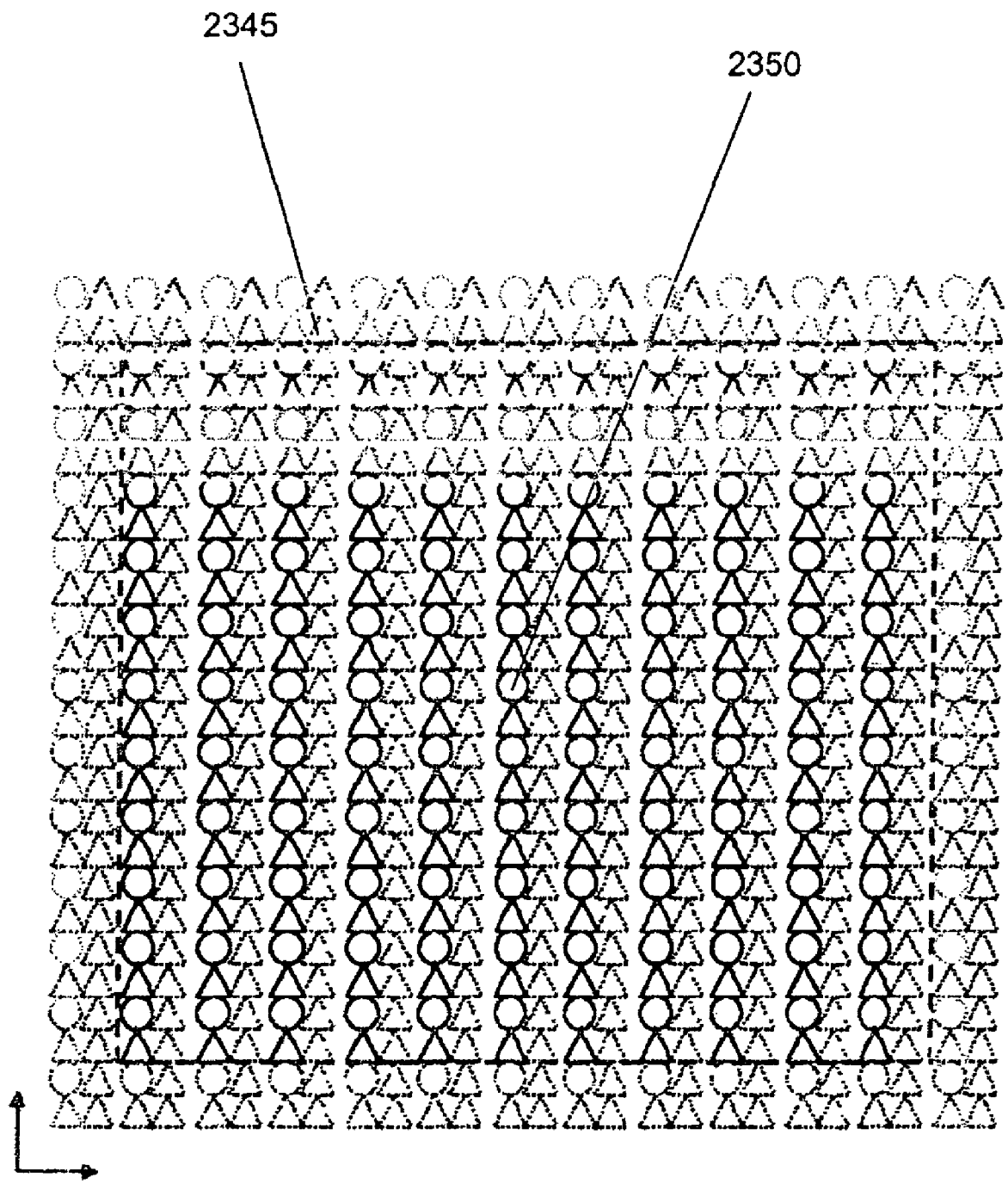

FIG. 23D illustrates an example of sampling pixels of an up-scaled image. Target pixel 2340 is centered in pixel window 2335. Pixel 2342 is an up-scaled pixel. Otherwise, the sampling type is similar to that of FIG. 23A, namely, 1×1 scanning. FIG. 23E illustrates 2×1 horizontal scanning of an up-scaled pixel region containing target pixel 2350 centered in pixel window 2345.

Figure 23F:
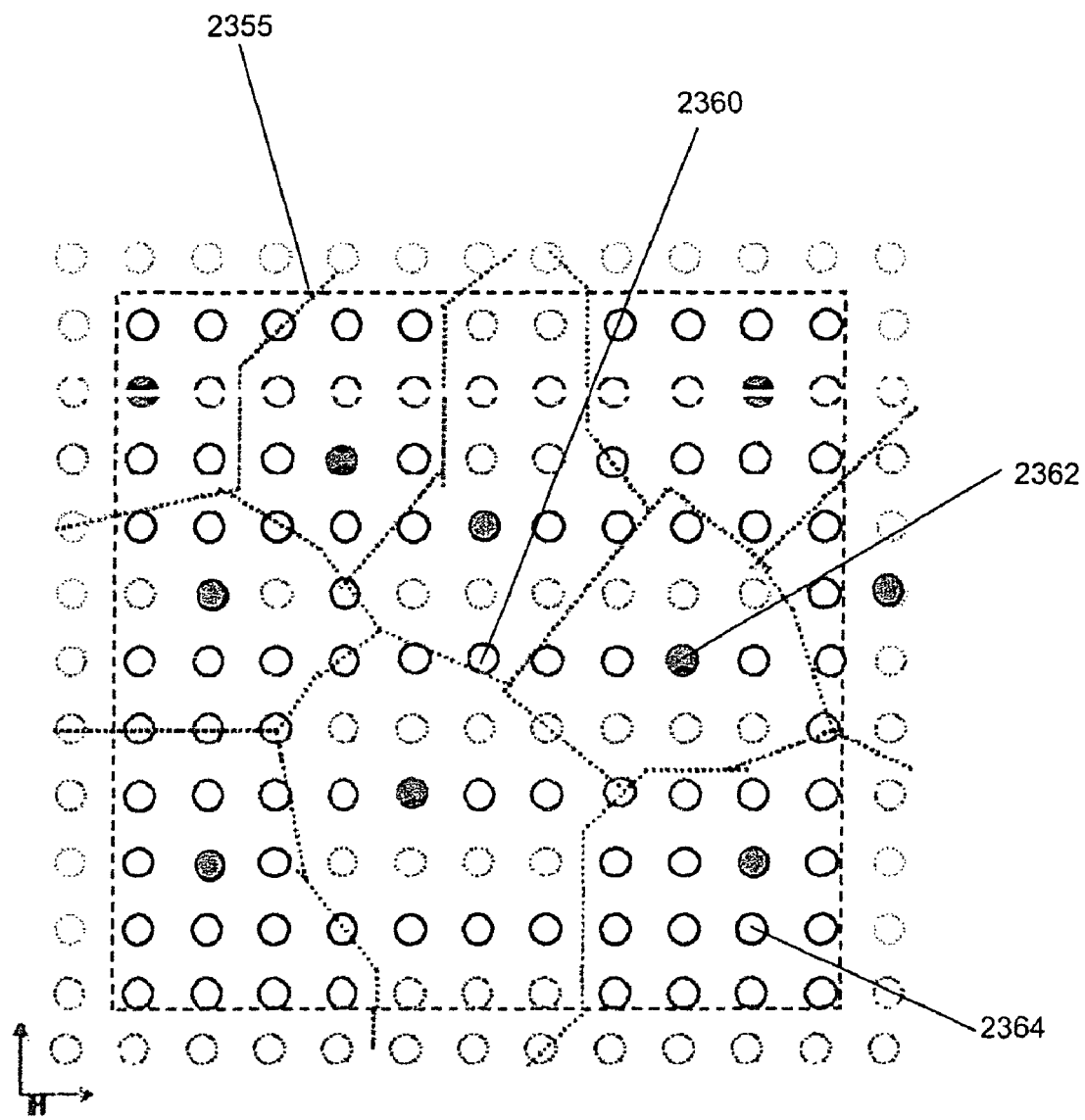
Figure 23G:
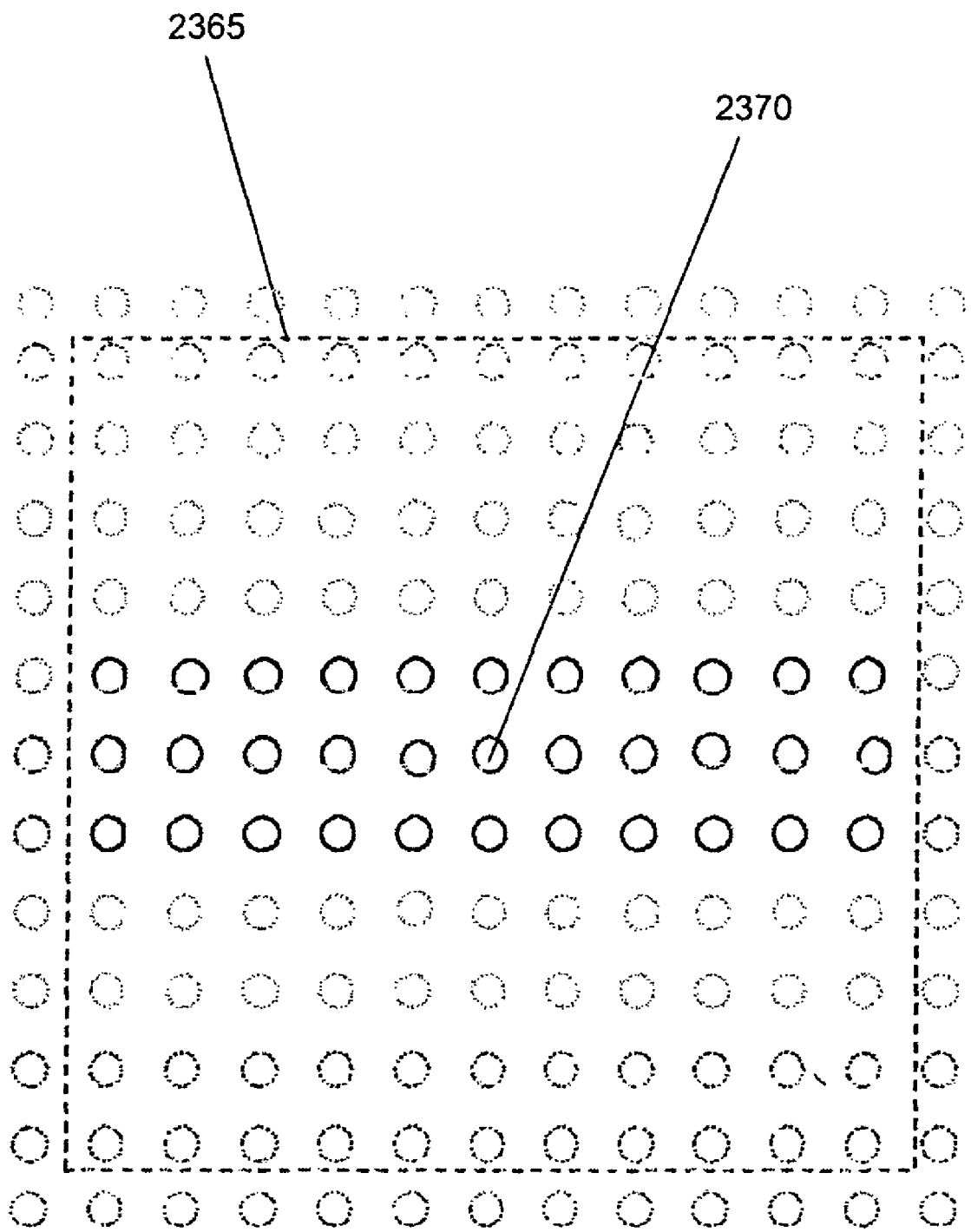

FIG. 23F illustrates an example of variable 2×1 vertical scanning. Target pixel 2360 is centered in pixel window 2355. The method 2220 scans pixels in sample cell 2362 using 2×1 vertical scanning, while scanning pixels such as pixel 2364 using 1×1 scanning. FIG. 23G illustrates an example of localized 1×1 scanning. Target pixel 2370 is centered in pixel window 2365. Target pixel 2370 is also the center of a localized band of scanned pixels. Other embodiments of the invention may use other sampling types. Each sampling type will generate different filter weights, in particular filter weights which will favor a direction. Various sampling types allow for directionality adaptation to be built into the filter. Directionality is described below in greater detail in conjunction with FIG. 28.

Figure 24A:
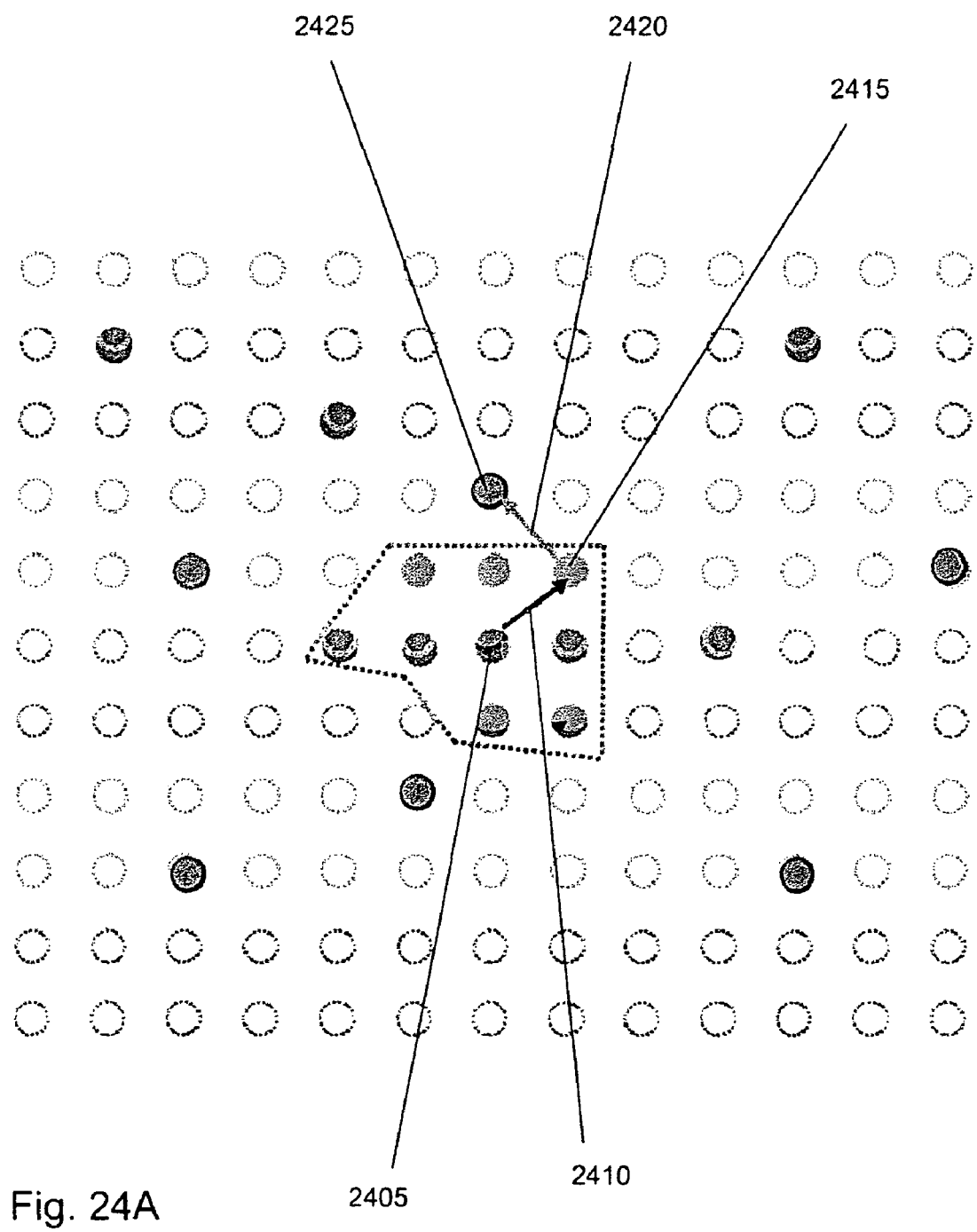
FIGS. 24A-24D are examples of pixel cells resulting from pixel sampling according to various embodiments of the invention.

FIGS. 24A-24D illustrate examples of target pixel cells for various sampling types and object boundaries. FIG. 24A illustrates the sample distance component of the pixel cell definition. The distance between target pixel 2405 and pixel 2415 (i.e., dist($\vec{x}$, $\vec{x}'$)) is indicated by arrow 2410. The distance between pixel 2415 and sample 2425 (i.e., $Dist_{min}^0(\vec{x}')$) is indicated by arrow 2420 and sample 2425 is chosen for pixel 2415 because pixel 2415 belongs to the sample cell of sample 2425. Since arrows 2410 and 2420 are equal in length, the distance between pixel 2415 and sample 2425 is less than the minimum sample distance for pixel 2415 and pixel 2415 satisfies the distance requirement for inclusion in the target pixel cell for target pixel 2405.

Figure 24B:
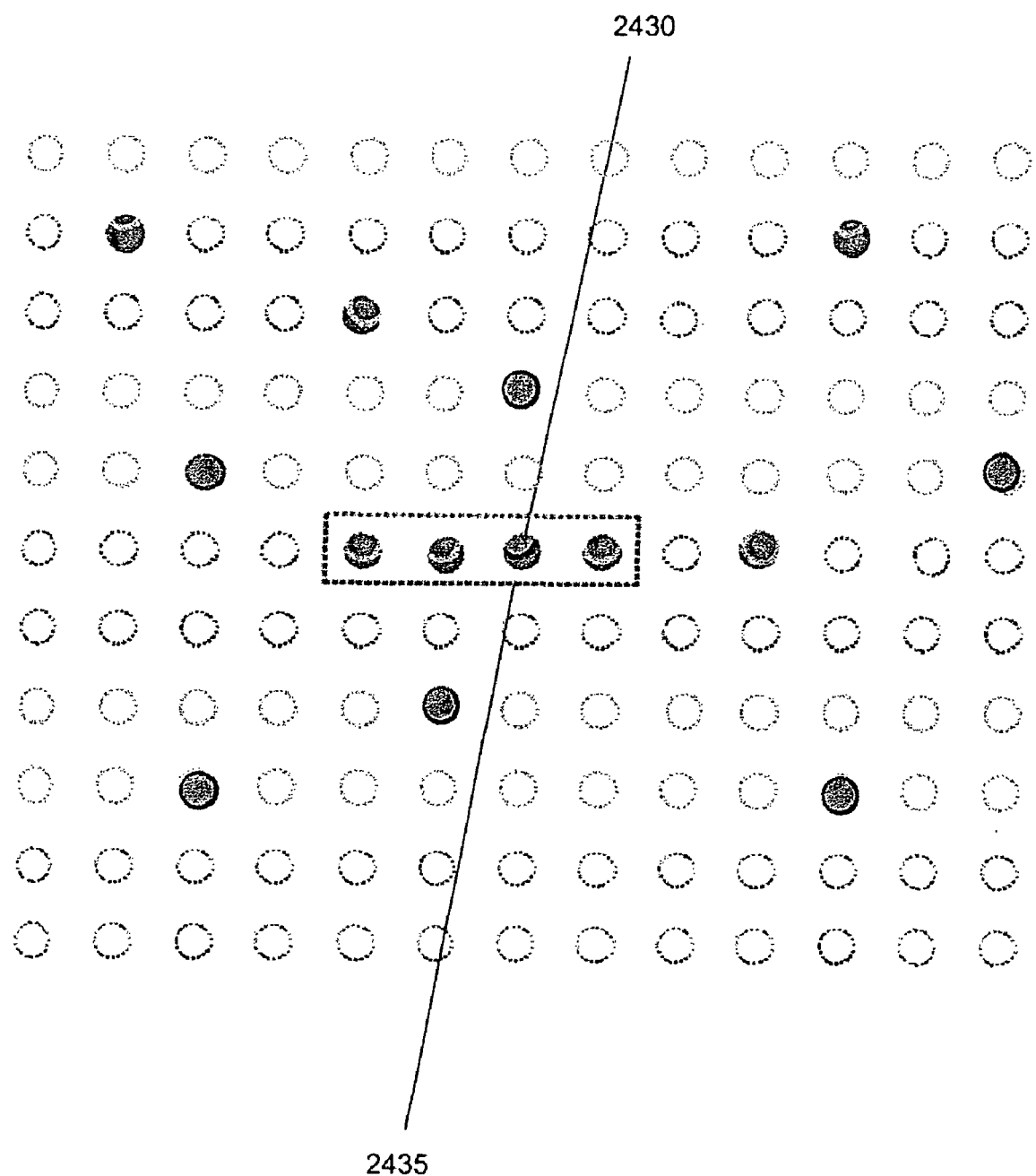
Figure 24C:
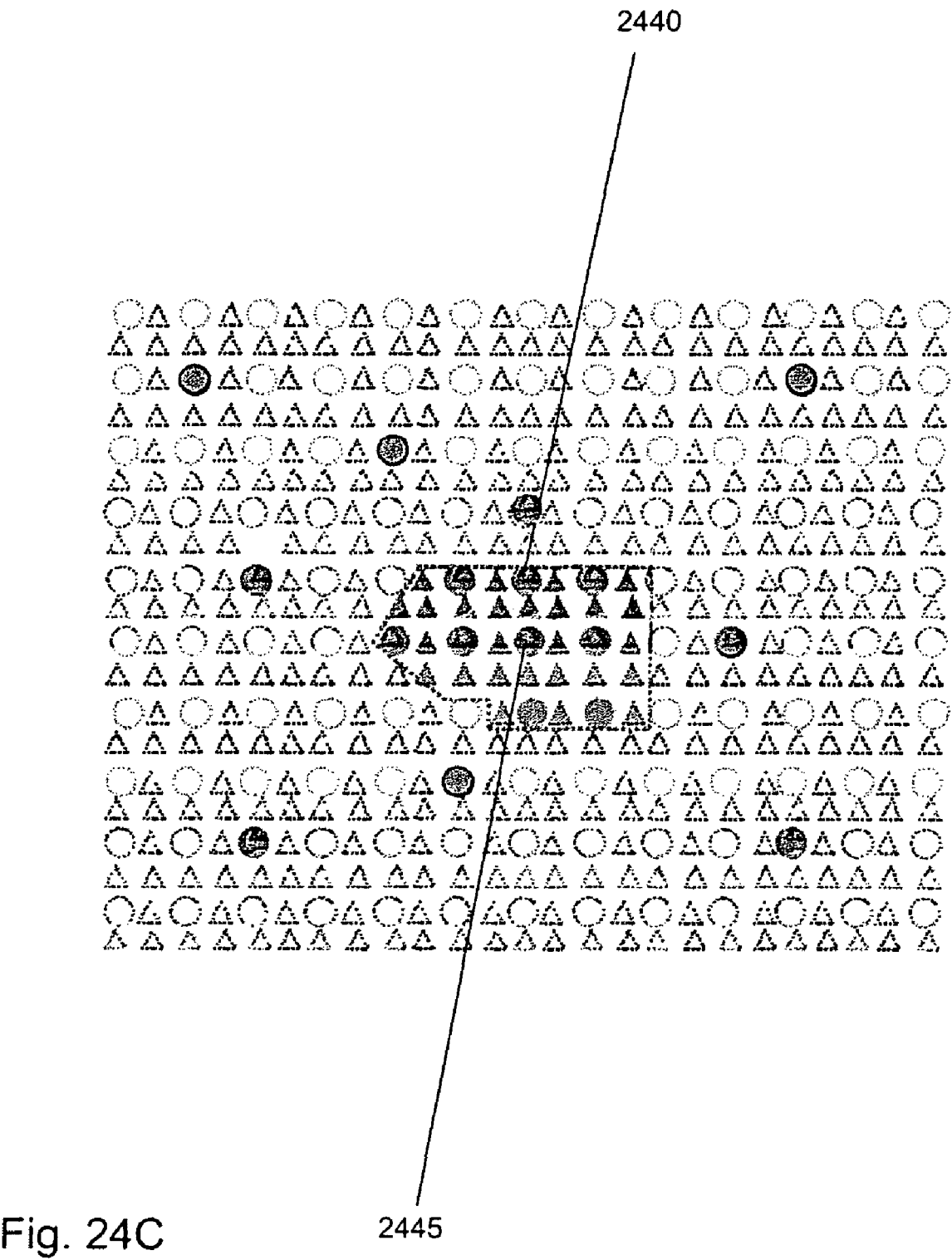
Figure 24D:
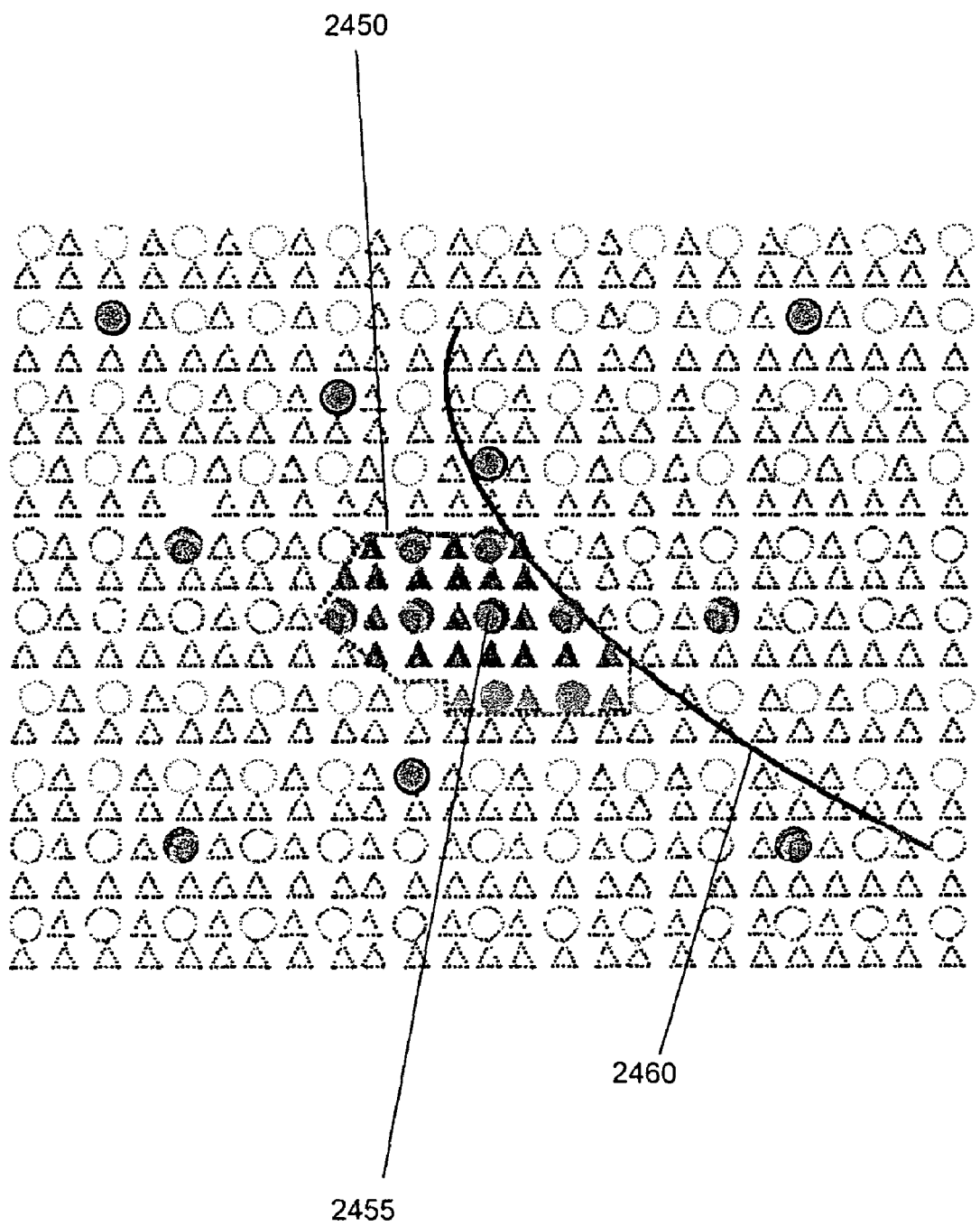

FIG. 24B illustrates a pixel cell 2435 using 2×1 vertical scanning associated with target pixel 2430. FIG. 24C illustrates a pixel cell 2440 using 1×1 sub-pixel scanning associated with target pixel 2445. FIG. 24D illustrates a pixel cell 2450 using 1×1 sub-pixel scanning associated with target pixel 2455. Object boundary 2460 has adjusted the border of pixel cell 2450.

Figure 25:
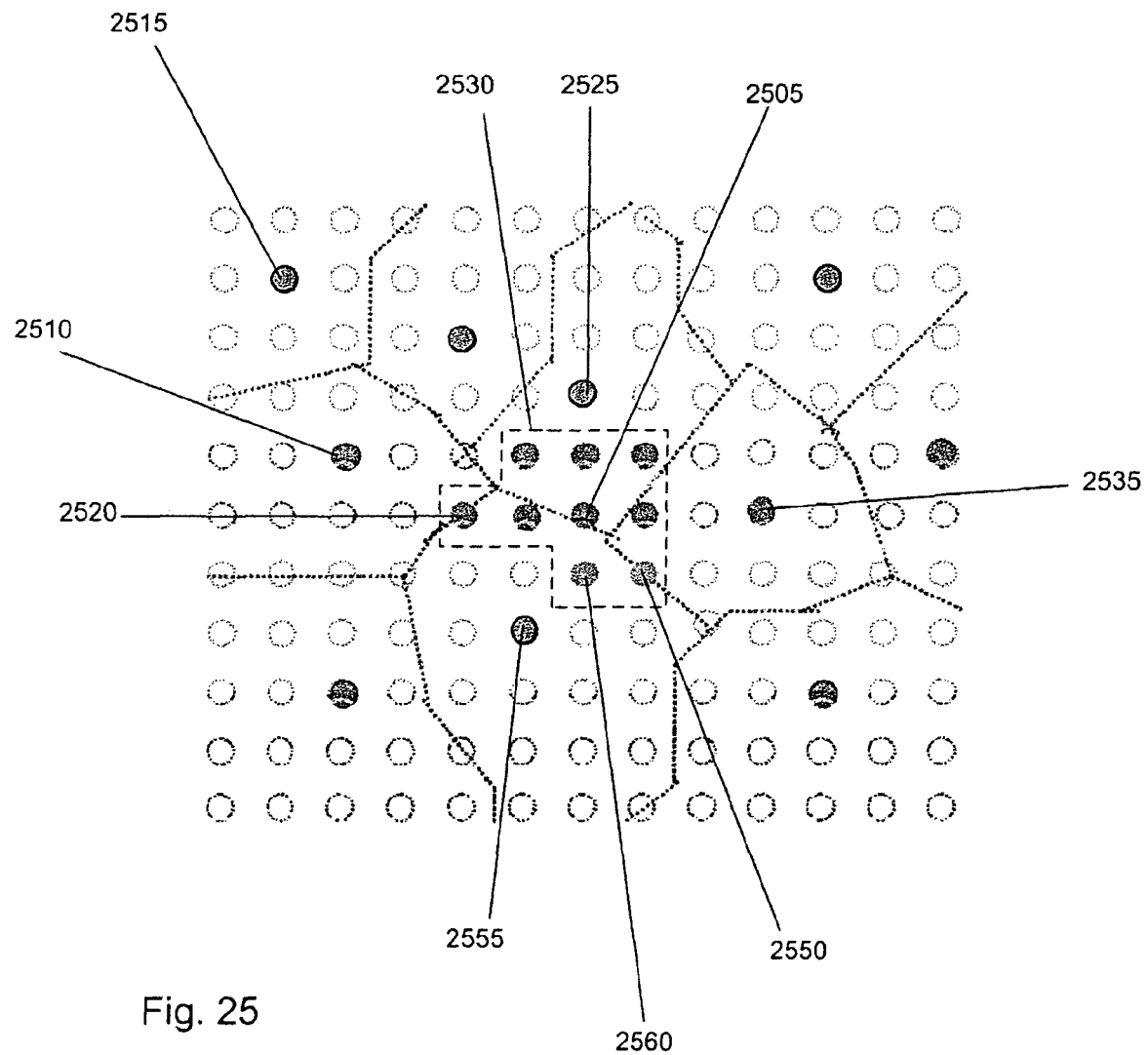
FIG. 25 is an example of filter coefficient computation according to an embodiment of the invention.

FIG. 25 illustrates examples of filter coefficient computations, such as those performed at block 2215 by the method 2200. Target pixel 2505 is associated with pixel cell 2530. The method determines weight factors for the set of samples. The intersection of the sample cell associated with sample 2515 and pixel cell 2530, for example, contains no pixels. Thus, the weight factor of sample 2515 for the target pixel 2505, per equation 17, is zero. The intersection of the sample cell associated with sample 2555 and the pixel cell 2530 results in four pixels. Since pixels 2520 and 2550 fall under sample cell boundaries, each will contribute ½ to the weight factor of sample 2555. The remaining two pixels, such as pixel 2560, will contribute 1, producing a weight factor of 3 for sample 2555. Samples 2510, 2525, and 2535 also have non-null intersections with pixel cell 2530. Accordingly, samples 2520, 2525, and 2535 will have non-zero weight factors and, along with sample 2555, will form the filter tap associated with target pixel 2505. Four samples in the filter tap will result in four sample filter coefficients, corresponding to the predictive strength of the four samples in relation to the target pixel. Each pixel for which a sample is a factor in the prediction thereof has its own corresponding sample filter coefficient.

Figure 26A:
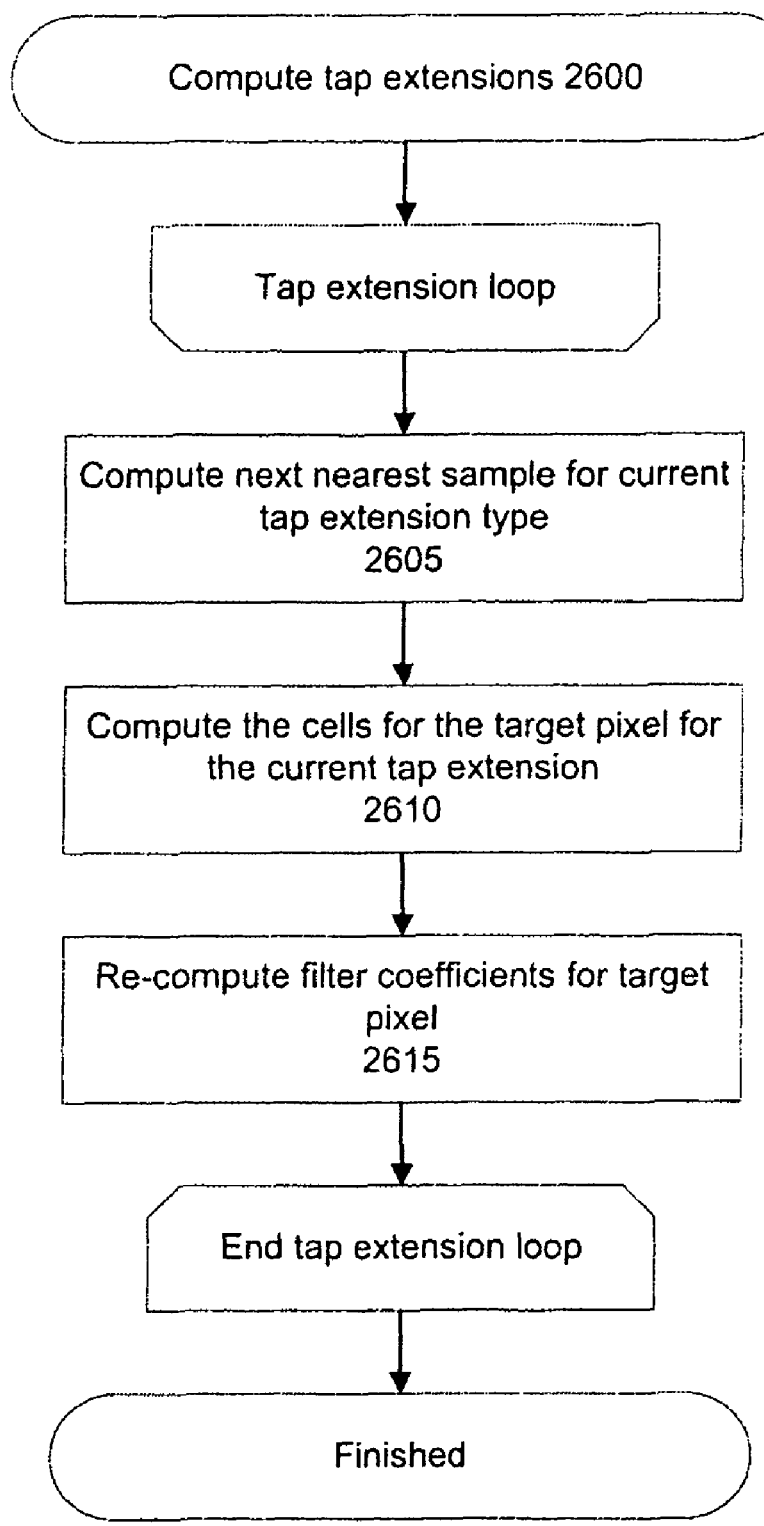
FIG. 26A is a flow diagram illustrating a tap extension computation method to be performed by a processor according to an embodiment of the invention.
Figure 26B:
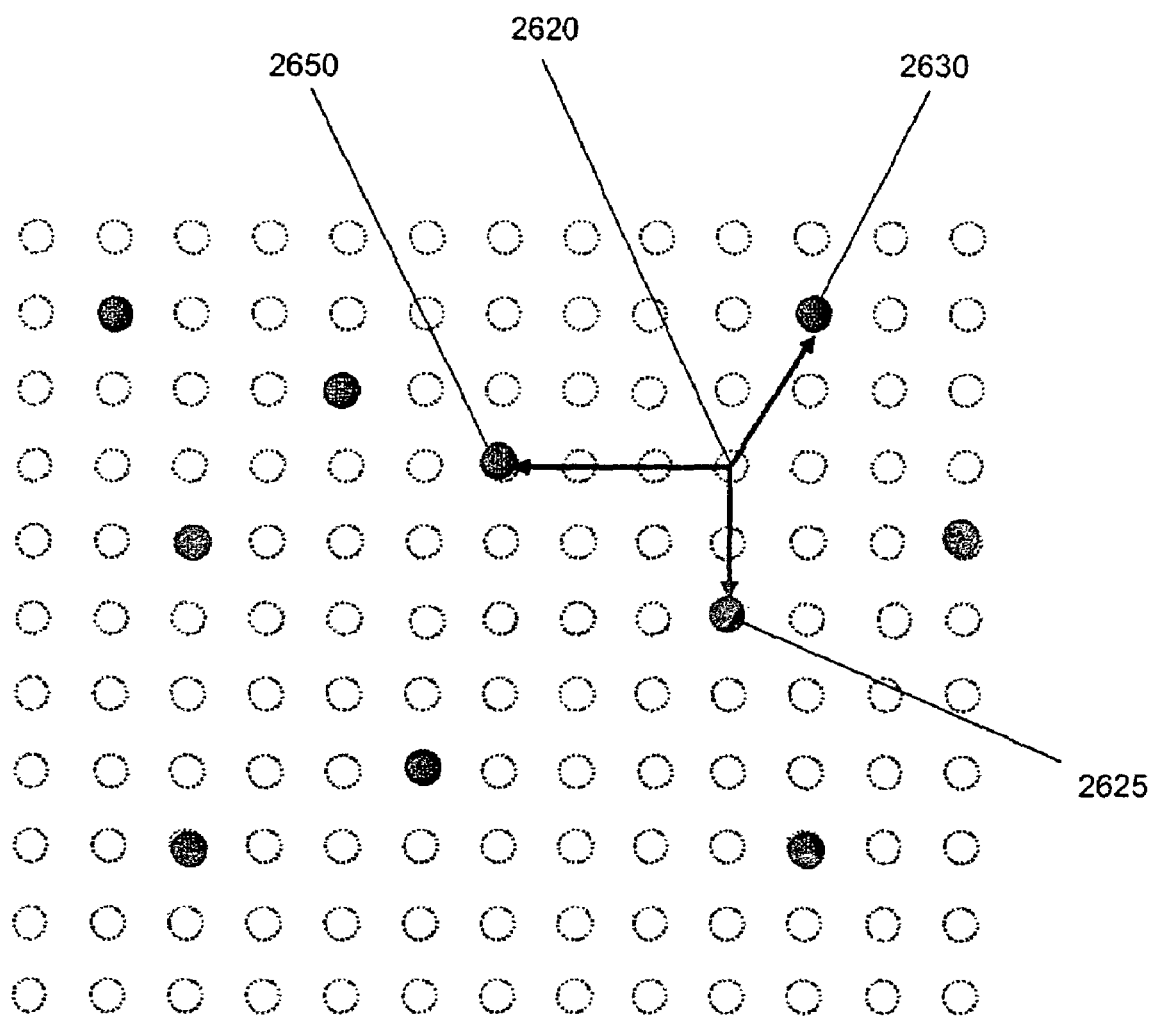
FIG. 26B is an example illustrating pixel-to-sample distances according to an embodiment of the invention.

Turning to FIG. 26A, compute tap extensions 2600 illustrates an embodiment of block 2220 of the method 2200. In one embodiment, a tap extension criteria extends a target pixel cell by incorporating pixels associated with the next-nearest sample. At block 2605, the method 2600 determines the next nearest sample for the current tap extension type. The method 2600 measures the distance from target pixel 2620 in FIG. 26B to other samples to determine the next closest sample. In this embodiment, the first iteration will use sample 2625, being closest to target pixel 2620. The next tap extension will use sample 2630, as the next closest, and sample 2650 as the next-next closest. Visual performance enhancement tends to saturate after three or four iterations, but other embodiments may use further iterations.

At block 2610, the method 2600 re-computes the pixel cell for the target pixel for the current tap extension, resulting in the pixel cell $C_{\vec{x}}^{ij}$, where i corresponds to the current sampling type, j corresponds to the current tap extension, and x is the current target pixel. $C_{\vec{x}}^{ij}$ may be defined as follows:

$$C_{\vec{x}}^{ij} = \{\vec{x}' \in Win(\vec{x}) | dist(\vec{x},\vec{x}') \leq Dist_{min}^1(\vec{x}').$$

$$T(\vec{x}')=T(\vec{x}),$$

$$M(\vec{x}')=M(\vec{x})\} \quad (21)$$

At block 2615, the method 2600 computes the filter coefficients for the target pixel corresponding to the tap extension j and sampling type i. Computation of the filter coefficients occurs as described above in conjunction with FIG. 22.

Figure 27A:
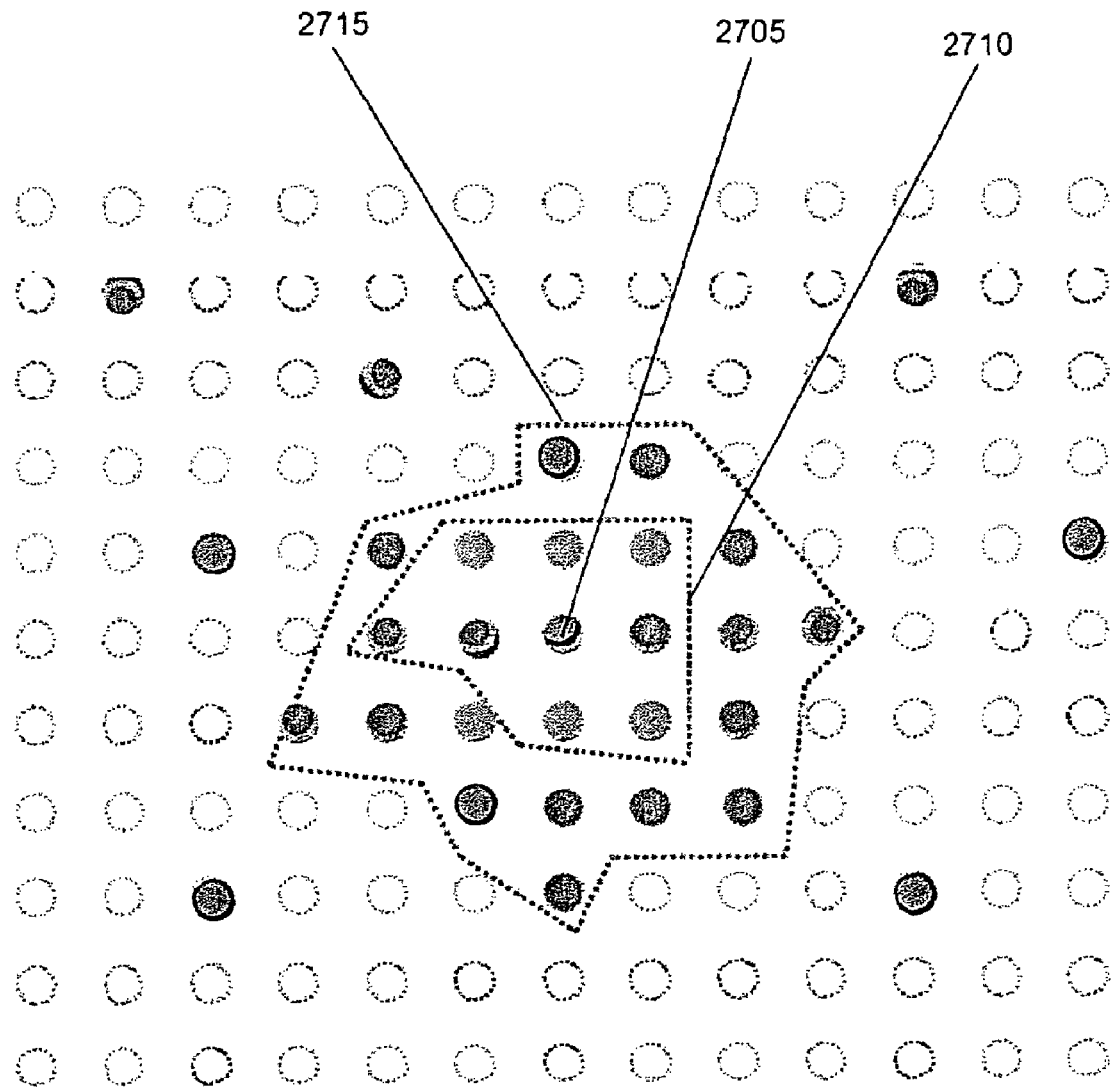
FIGS. 27A-27C are examples illustrating combinations of pixel sampling types and tap extensions according to various embodiments of the invention.
Figure 27B:
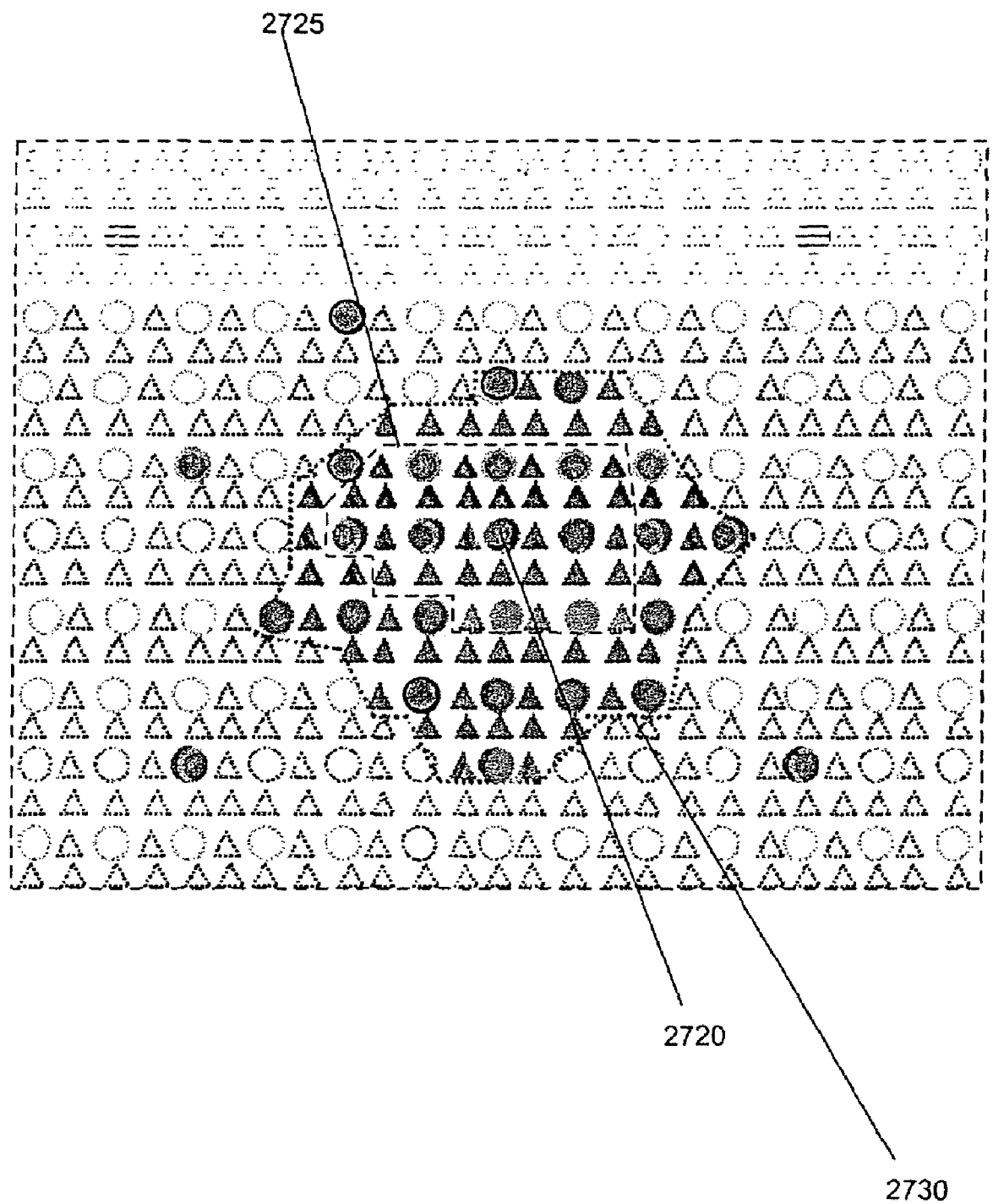
Figure 27C:
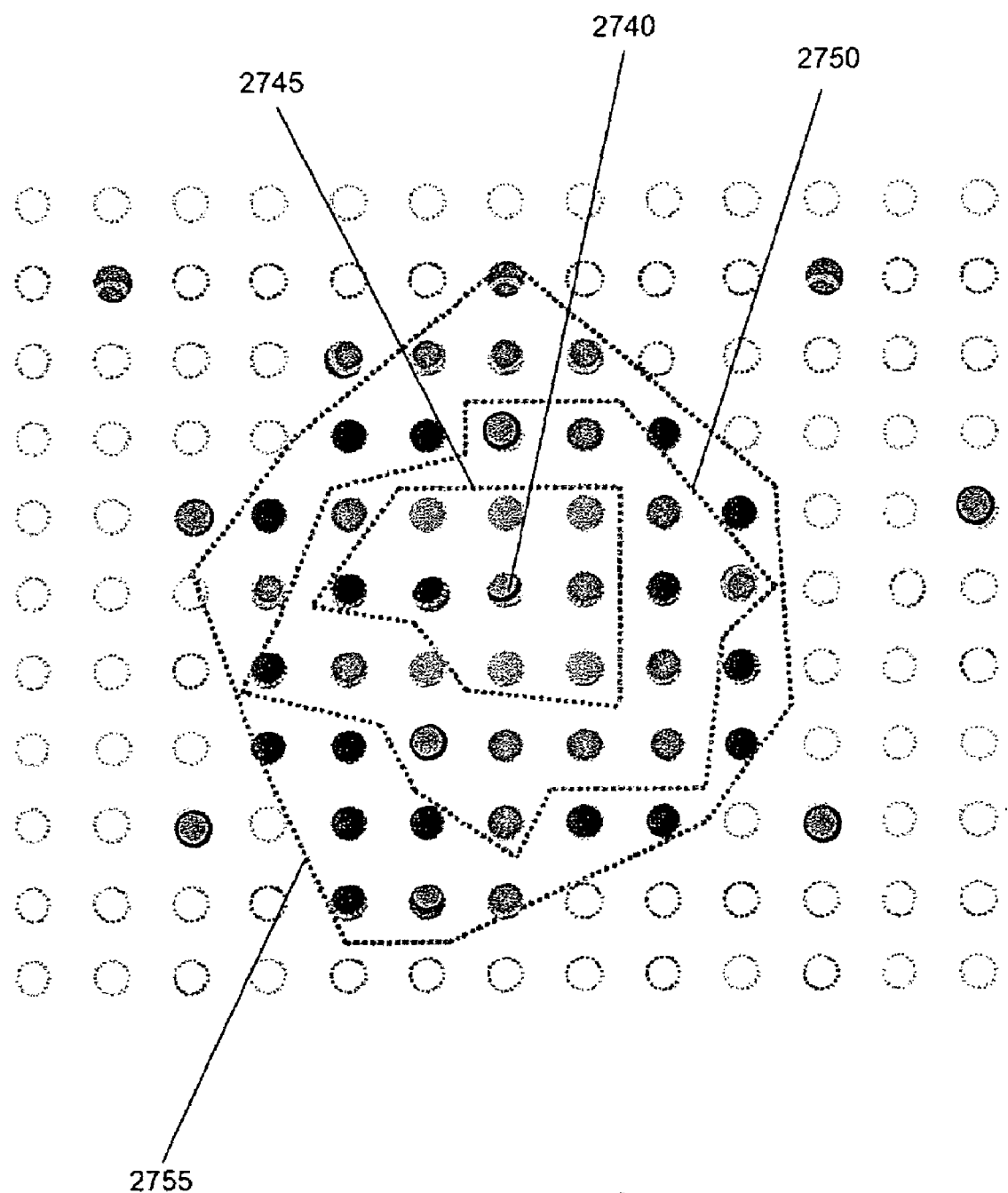

FIG. 27A illustrates an example of filter tap extension creating an extended target pixel cell. The method 2600 initially associates target pixel 2705 with pixel cell 2710. After a filter tap extension, the method 2600 associates target pixel 2705 with pixel cell 2715. Three equally proximate samples were added as a result of the tap extension. FIG. 27B illustrates an example of filter tap extension and sampling type. The method 2600 initially associates target pixel 2720 with pixel cell 2725. After a filter tap extension, the method 2600 associates target pixel 2720 with extended pixel cell 2730. Pixel cell 2730 has smoother contours than pixel cell 2720, which produces smoother filter coefficients. FIG. 27C illustrates three iterations of pixel cells associated with pixel cell 2740: initial cell 2745, second cell 2750, and third cell 2755.

Returning to block 1515 of FIG. 15, the method 1500 extracts optimal filter weights from the various prediction filters described above. Each pixel sampling type and tap extension described above generates a particular prediction filter for all the pixels $\vec{x}$ in the image, may be defined as follows:

$$P^{ij}(\vec{x}) = \sum_{k \in S_{ij}(\vec{x})} f_k^{\vec{x},ij} L_k \qquad (22)$$

where i=1, 2, ... n denotes the pixel sampling types and j=1, 2 ... m denotes the tap extensions. The case j=0 refers to using no tap extensions. The multiple prediction filters may be combined with weight parameters $\{\alpha_{ij}^s\}$ to form a final prediction, defined as:

$$P(\vec{x}) = \sum_{i=1}^{n} \sum_{j=0}^{m} \alpha_{ij}^s P^{ij}(\vec{x}) \qquad (23)$$

where the index s=1, 2, ... p refers to image class used for the target pixel $\vec{x}$, such as a texture class, motion class, object class, etc. The final prediction may also be defined as:

$$P(\vec{x}) = \sum_{i=1}^{n} \sum_{j=0}^{m} \alpha_{ij}^s P^{ij}(\vec{x}) \sum_{k \in S(\vec{x})} f_k^{\vec{x}} L_k \qquad (24)$$

where the final filter coefficients may be defined as:

$$f_k^{\vec{x}} = \sum_{i=1}^{n} \sum_{j=0}^{m} \alpha_{ij}^s f_k^{\vec{x},ij} \qquad (25)$$

while the filter tap may be defined as:

$$S(\vec{x}) = S_{10}(\vec{x}) \cup S_{20}(\vec{x}) \ldots \cup S_{n0}(\vec{x}) \cup S_{11}(\vec{x}) \ldots$$
$$\cup S_{n1}(\vec{x}) \cup S_{12}(\vec{x}) \ldots \cup S_{nm}(\vec{x}) \qquad (26)$$

$S_{ij}(\vec{x})$, therefore, contains the samples k that are contained in at least one of the taps $S_{ij}(\vec{x})$. Least squares weight parameters $\{\alpha_{ij}^s, i=1, 2 \ldots, j=1, 2 \ldots m, s=1, 2 \ldots p\}$ are obtained with least squares training using the original/target image data. Using least squares training to determine optimal parameters is well known in the art. The classified least square training applied by the method 1500 for the n(m+1)p parameters $\{\alpha_{i,j}^s\}$ generates an adaptive prediction filter that is applicable to any sampling pattern.

Figure 28:
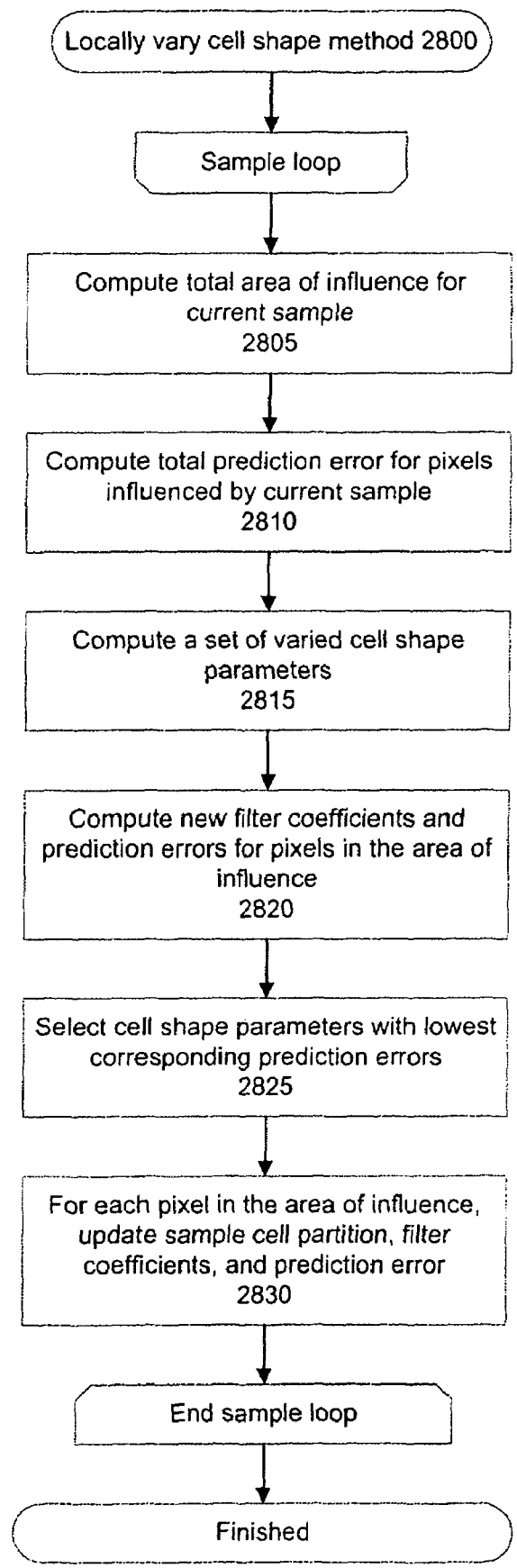
FIG. 28 is a flow diagram illustrating a method for locally varying sample cell shapes to be performed by a processor according to an embodiment of the invention.

Turning to FIG. 28, locally vary cell shape method 2800 illustrates one embodiment of block 1515 of the method 1500. At block 2805, the method 2800 may compute the area of influence for the current sample as follows:

$$A(k) = \{\vec{x}; |f_k^{\vec{x}}| > 0, i=1, 2 \ldots n, j=0, 1, \ldots m\} \qquad (27)$$

At block 2810, the method 2800 may compute the total prediction error for pixels influenced by the current sample as follows:

$$e_k = \sum_{\vec{x} \in A(k)} e(\vec{x}) \qquad (28)$$

where $e_k$ is the total prediction error for the pixels influenced by the sample k. At block 2815, sample cell shape parameters $\{\gamma_k, \beta_k\}$ are altered. In one embodiment, a pre-defined set of values may be used, such as:

$$\{\gamma_k=2,\beta_k=1\}, \{\gamma_k=4,\beta_k=1\}, \{\gamma_k\gamma_1, \beta_k=2\}, \{\gamma_k=0.5,$$
$$\beta_k=4\}, \{\gamma_k=2,\beta_k=2\varnothing, \{\gamma_k=0.25,\beta_k=1\}, \{\gamma_k=1,$$
$$\beta_k=1\{, \beta_k=0.25\}, \text{etc.} \qquad (29)$$

However, other embodiments may use other pre-defined sets, or may dynamically determine shape parameter variation. At block 2820, the method 2800 computes new filter coefficients and prediction errors for pixels in the area of influence, as described above in conjunction with FIGS. 22 and 26. At block 2825, the method 2800 selects the cell shape parameters with the lowest corresponding prediction errors. At block 2830, for each pixel in the area of influence, the method 2800 updates the sample cell partition, filter coefficients, and prediction error.

Figure 29A:
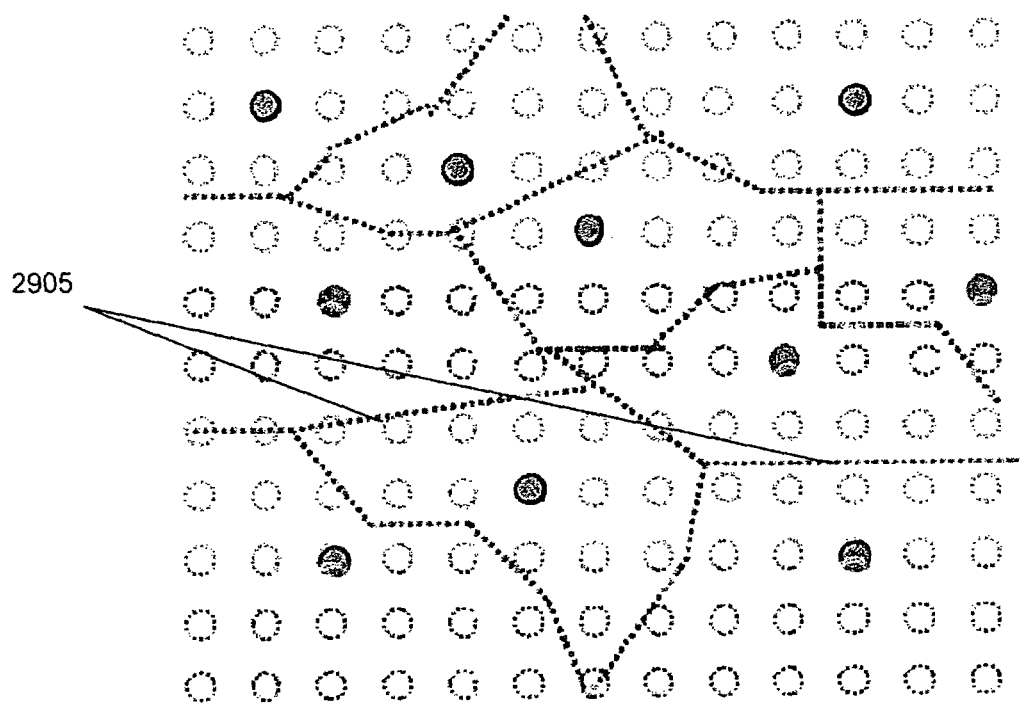
FIG. 29A is an example illustrating a horizontally elongated sample partition according to an embodiment of the invention.
Figure 29B:
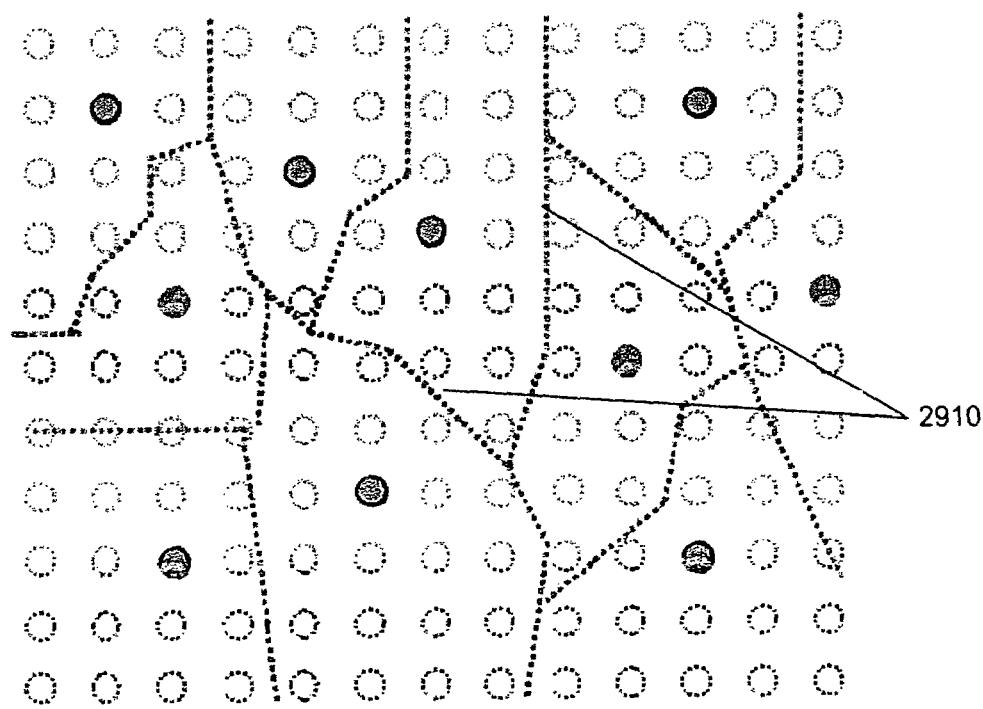
FIG. 29B is an example illustrating a vertically elongated sample partition according to an embodiment of the invention.

FIGS. 29A and 29B illustrate examples of sample cell shape and directionality. FIG. 29A illustrates horizontally elongated pixel cells, such as cells 2905. As described above in conjunction with FIG. 28, the method 2800 varies the shape of pixel cells in order to improve their prediction value. Certain "real" objects represented in pixel data, such as a brick in a wall, tend to be predicted better using horizontal cell shapes, since the "real" object is itself more horizontal than vertical. Such tendencies may be referred to as "organic." In this way, the method 2800 organically obtains a more accurate prediction by adjusting pixel shape in a manner related to the "real" object represented in the image data. FIG. 29B illustrates an example of vertically elongated sample cells, such as cells 2910. Certain "real" objects favor vertical cell shapes, such as flagpoles. By adjusting the sample set in an organic fashion, the invention determines an optimal arrangement incorporating characteristics of the "real" objects in the image data.

The particular methods of the invention have been described in terms of computer software with reference to a series of flow diagrams 2, 5, 7, 8, 9, 11, 12, 15, 17, 22, 26A, and 28. Describing the methods by reference to a flow diagram enables one skilled in the art to develop such programs including such instructions to carry out the methods on suitably configured computers (the processor of the computer executing the instructions from computer-readable media, including memory) The computer-executable instructions may be written in a computer programming language or may be embodied in firmware logic. If written in a programming language conforming to a recognized standard, such instructions execute on a variety of hardware platforms and for interface to a variety of operating systems. In addition, description of the present invention is not made with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods illustrated in FIGS. 2, 5, 7, 8, 9, 11, 12, 15, 17, 22, 26A, and 28 without departing from the scope of the invention and that no particular order is implied by the arrangement of blocks shown and described herein.

Figure 30A:
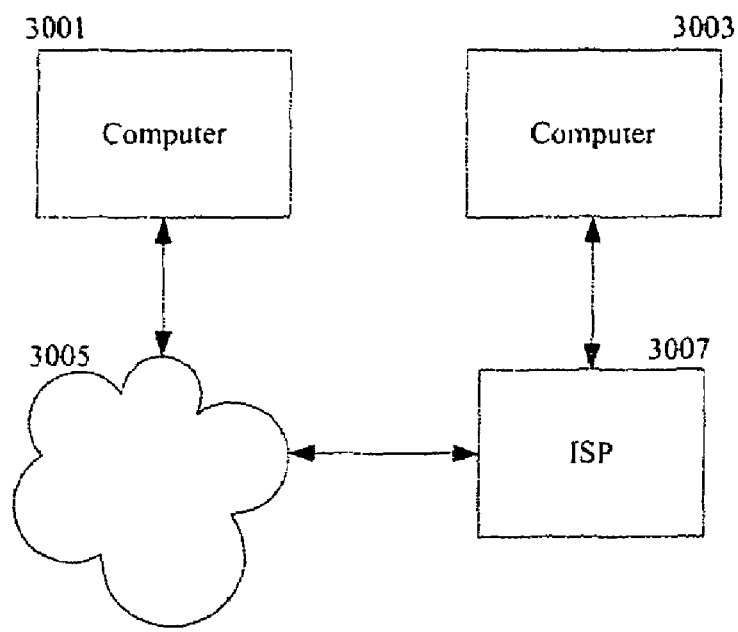
FIGS. 30A and 30B are diagrams of a computer environment suitable for practicing the invention.

In one embodiment, as shown in FIG. 30A, a server computer 3001 is coupled to and provides data through, the Internet 3005. A client computer 3003 is coupled to the Internet 3005 through an ISP (Internet Service Provider) 3007 and executes a conventional Internet browsing application to exchange data with the server 3001. For example, adaptive generator 191 may execute on computer 3001 in response to a user request transmitted from computer 3003 through ISP 3007 and Internet 3005. Optionally, the server 3001 can be part of an ISP which provides access to the Internet for client systems. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet allows users of client computer systems to exchange information, receive and send e-mails, view documents, such as documents which have been prepared in the HTML format, and receive content. It is readily apparent that the present invention is not limited to Internet access and Internet web-based sites; directly coupled and private networks are also contemplated.

Figure 30B:
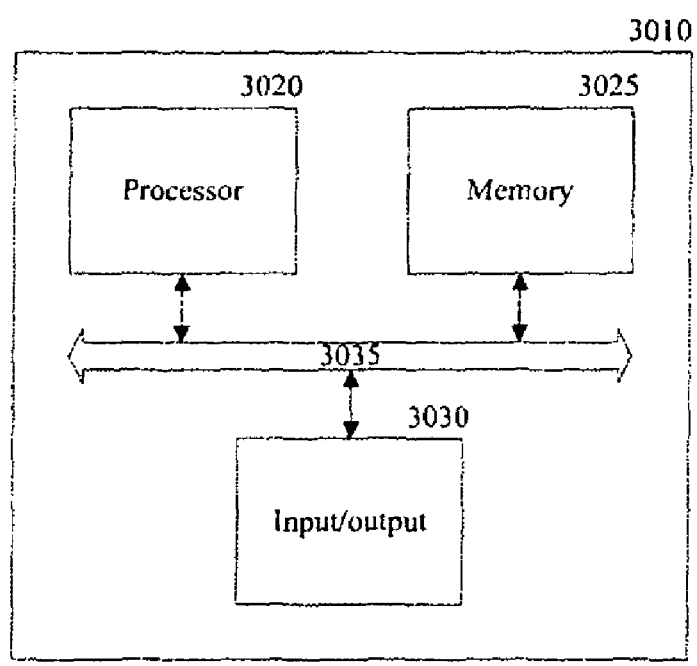

One embodiment of a computer system suitable for use as server 3001 is illustrated in FIG. 30B. The computer system 3010, includes a processor 3020, memory 3025 and input/output capability 3030 coupled to a system bus 3035. The memory 3025 is configured to store instructions which, when executed by the processor 3020, perform the methods described herein. The memory 3025 may also store data for/of an adaptive generator. Input/output 3030 provides for the delivery and display of the data for/of an adaptive generator or portions or representations thereof, and also the input of data of various types for storage, processing or display. Input/output 3030 also encompasses various types of computer-readable storage media, including any type of storage device that is accessible by the processor 3020. For example, input/output 3030 may correspond to input 190, output display device 192 and output transmission device 193. One of skill in the art will immediately recognize that the server 3001 is controlled by operating system software executing in memory 3025. Input/output 3030 and related media store the machine-executable instructions for the operating system and methods of the present invention as well as the data for/of an adaptive generator.

The description of FIGS. 30A-B is intended to provide an overview of computer hardware and other operating components suitable for implementing the invention, but is not intended to limit the applicable environments. It will be appreciated that the computer system 3010 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

An adaptive generator of irregular spatial sub-sampling for images has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A computerized method comprising:
   applying an adaptive filter to samples in an initial pattern of samples, wherein the samples in the initial pattern correspond to pixels to be predicted;
   varying a level value of each sample, wherein the level value corresponds to a predictive strength of the sample in relation to the pixels to be predicted;
   generating a first prediction pattern from the samples;
   performing a sample movement process on a current sample in the first prediction pattern to change a current position of the current sample in the first prediction pattern;
   updating a local prediction of pixels influenced by the current sample if the current position of the current sample is changed;
   performing a sample removal process on the current sample in the first prediction pattern to remove the current sample from the first prediction pattern if a criteria is satisfied;
   updating a local prediction of pixels influenced by the current sample if the current sample is removed;
   generating a second prediction pattern from the samples remaining in the first prediction pattern; and
   outputting the second prediction pattern.

2. The computerized method of claim 1, wherein the sample movement process comprises:
   computing a different sample position for the current sample;
   computing a current prediction error corresponding to the current position;
   computing a different prediction error corresponding to the different sample position; and
   moving the current sample to a position with a lowest prediction error.

3. The computerized method of claim 2, wherein the updating a local prediction comprises:
   computing an area of influence of the sample, the area of influence including pixels for which the sample is a factor in a prediction thereof;
   updating a local prediction error for pixels in the area of influence of the current sample;
   updating filter coefficients for the pixels in the area of influence, wherein the filter coefficients define a prediction relationship between the current sample and the pixels;
   applying the adaptive filter to the pixels in the area of influence; and
   applying the level variation to the current sample.

4. The computerized method of claim 1, wherein the sample removal process comprises:
   determining, from a current prediction of the pixels in the area of influence, a current prediction error, the current prediction including the predictive weight of the current sample;

determining, from a test prediction of the pixels in the area of influence, a test prediction error, the test prediction excluding the predictive weight of the current sample;

removing the current sample if an absolute value of a difference between the current prediction error and the test prediction error is less than a sample removal threshold.

5. The computerized method of claim 4, wherein the removing the current sample further comprises:

determining a sample density, the determining excluding the presence of the current sample;

removing the current sample if the sample density is greater than a minimum sample density.

6. The computerized method of claim 4, the method further comprising:

computing an area of influence of the sample, the area of influence including pixels for which the sample is a factor in a prediction thereof;

updating, if the current sample is removed, a local prediction error for pixels in the area of influence of the current sample;

updating, if the current sample is removed, filter coefficients for the pixels in the area of influence, wherein the filter coefficients define a prediction relationship between the current sample and the pixels;

applying, if the current sample is removed, the adaptive filter to the pixels in the area of influence; and applying the level variation to the current sample if the current sample remains in the first prediction pattern.

7. A non-transitory computer-readable storage medium storing instructions which when executed by a data processing system cause the data processing system to perform operations that process data, the operations comprising:

applying an adaptive filter to samples in an initial pattern of samples, wherein the samples in the initial pattern correspond to pixels to be predicted;

varying a level value of each sample, wherein the level value corresponds to a predictive strength of the sample in relation to the pixels to be predicted;

generating a first prediction pattern from the samples;

performing a sample movement process on a current sample in the first prediction pattern to change a current position of the current sample in the first prediction pattern;

updating a local prediction of pixels influenced by the current sample if the current position of the current sample is changed;

performing a sample removal process on the current sample in the first prediction pattern to remove the current sample from the first prediction pattern if a criteria is satisfied;

updating a local prediction of pixels influenced by the current sample if the current sample is removed;

generating a second prediction pattern from the samples remaining in the first prediction pattern; and outputting the second prediction pattern.

8. The non-transitory computer-readable storage medium of claim 7, wherein the sample movement process comprises:

computing a different sample position for the current sample;

computing a current prediction error corresponding to the current position;

computing a different prediction error corresponding to the different sample position; and moving the current sample to a position with a lowest prediction error.

9. The non-transitory computer-readable storage medium of claim 8, wherein the updating a local prediction comprises:

computing an area of influence of the sample, the area of influence including pixels for which the sample is a factor in a prediction thereof;

updating a local prediction error for pixels in the area of influence of the current sample;

updating filter coefficients for the pixels in the area of influence, wherein the filter coefficients define a prediction relationship between the current sample and the pixels;

applying the adaptive filter to the pixels in the area of influence; and applying the level variation to the current sample.

10. The non-transitory computer-readable storage medium of claim 7, wherein the sample removal process comprises:

determining, from a current prediction of the pixels in the area of influence, a current prediction error, the current prediction including the predictive weight of the current sample;

determining, from a test prediction of the pixels in the area of influence, a test prediction error, the test prediction excluding the predictive weight of the current sample;

removing the current sample if an absolute value of a difference between the current prediction error and the test prediction error is less than a sample removal threshold.

11. The non-transitory computer-readable storage medium of claim 10, wherein the removing the current sample further comprises:

determining a sample density, the determining excluding the presence of the current sample;

removing the current sample if the sample density is greater than a minimum sample density.

12. The non-transitory computer-readable storage medium of claim 10, the operations further comprising:

computing an area of influence of the sample, the area of influence including pixels for which the sample is a factor in a prediction thereof;

updating, if the current sample is removed, a local prediction error for pixels in the area of influence of the current sample;

updating, if the current sample is removed, filter coefficients for the pixels in the area of influence, wherein the filter coefficients define a prediction relationship between the current sample and the pixels;

applying, if the current sample is removed, the adaptive filter to the pixels in the area of influence; and applying the level variation to the current sample if the current sample remains in the first prediction pattern.

13. A system comprising:

a processor coupled to a bus;

a memory coupled to the processor through the bus; and instructions executed by the processor from the memory to cause the processor to apply an adaptive filter to samples in an initial pattern of samples, wherein the samples in the initial pattern correspond to pixels to be predicted, vary a level value of each sample, wherein the level value corresponds to a predictive strength of the sample in relation to the pixels to be predicted, generate a first prediction pattern from the samples, perform a sample movement process on a current sample in the first prediction pattern to change a current position of the current sample in the first prediction pattern, update a local prediction of pixels influenced by the current sample if the current position of the current sample is changed, perform a sample removal process on the current sample in the first prediction pattern to remove the current sample from the first prediction pattern if a criteria is satisfied, update a local prediction of pixels influenced by the current sample if the current sample is removed, generate a second prediction pattern from the samples remaining in the first prediction pattern, and output the second prediction pattern.

14. The system of claim 13, wherein the sample movement process comprises:
computing a different sample position for the current sample;
computing a current prediction error corresponding to the current position;
computing a different prediction error corresponding to the different sample position; and
moving the current sample to a position with a lowest prediction error.

15. The system of claim 14, wherein the updating a local prediction comprises:
computing an area of influence of the sample, the area of influence including pixels for which the sample is a factor in a prediction thereof;
updating a local prediction error for pixels in the area of influence of the current sample;
updating filter coefficients for the pixels in the area of influence, wherein the filter coefficients define a prediction relationship between the current sample and the pixels;
applying the adaptive filter to the pixels in the area of influence; and
applying the level variation to the current sample.

16. The system of claim 13, wherein the sample removal process comprises:
determining, from a current prediction of the pixels in the area of influence, a current prediction error, the current prediction including the predictive weight of the current sample;
determining, from a test prediction of the pixels in the area of influence, a test prediction error, the test prediction excluding the predictive weight of the current sample;
removing the current sample if an absolute value of a difference between the current prediction error and the test prediction error is less than a sample removal threshold.

17. The system of claim 16, wherein the removing the current sample further comprises:
determining a sample density, the determining excluding the presence of the current sample;
removing the current sample if the sample density is greater than a minimum sample density.

18. The system of claim 16, the instructions further comprising:
computing an area of influence of the sample, the area of influence including pixels for which the sample is a factor in a prediction thereof;
updating, if the current sample is removed, a local prediction error for pixels in the area of influence of the current sample;
updating, if the current sample is removed, filter coefficients for the pixels in the area of influence, wherein the filter coefficients define a prediction relationship between the current sample and the pixels;
applying, if the current sample is removed, the adaptive filter to the pixels in the area of influence; and
applying the level variation to the current sample if the current sample remains in the first prediction pattern.

19. An apparatus comprising:
means for receiving image data, the image data comprising an initial pattern of samples;
means for applying an adaptive filter to samples in the initial pattern of samples, wherein the samples in the initial pattern correspond to pixels to be predicted;
means for varying a level value of each sample, wherein the level value corresponds to a predictive strength of the sample in relation to the pixels to be predicted;
means for generating a first prediction pattern from the samples;
means for performing a sample movement process on a current sample in the first prediction pattern to change a current position of the current sample in the first prediction pattern;
means for updating a local prediction of pixels influenced by the current sample if the current position of the current sample is changed;
means for performing a sample removal process on the current sample in the first prediction pattern to remove the current sample from the first prediction pattern if a criteria is satisfied;
means for updating a local prediction of pixels influenced by the current sample if the current sample is removed;
means for generating a second prediction pattern from the samples remaining in the first prediction pattern; and
means for outputting the second prediction pattern.

* * * * *